US012654325B2

(12) United States Patent
Oboril et al.

(10) Patent No.: US 12,654,325 B2
(45) Date of Patent: Jun. 16, 2026

(54) TASK IMPACT ZONE AND 4-DIMENSIONAL SAFETY ENVELOPE FOR ROBOTS

(71) Applicant: Intel Corporation, Santa Clara, CA (US)

(72) Inventors: Fabian Oboril, Karlsruhe (DE); Cornelius Buerkle, Karlsruhe (DE); Bernd Gassmann, Straubenhardt (DE); Frederik Pasch, Karlsruhe (DE); Kay-Ulrich Scholl, Malsch (DE)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 17/553,874

(22) Filed: Dec. 17, 2021

(65) Prior Publication Data

US 2022/0105636 A1 Apr. 7, 2022

(51) Int. Cl.
| | |
|---|---|
| *B25J 13/08* | (2006.01) |
| *B25J 5/06* | (2006.01) |
| *B25J 9/16* | (2006.01) |
| *B25J 19/06* | (2006.01) |

(52) U.S. Cl.
CPC ............. *B25J 9/1676* (2013.01); *B25J 9/162* (2013.01); *B25J 9/163* (2013.01); *B25J 9/1651* (2013.01); *B25J 9/1666* (2013.01); *B25J 13/089* (2013.01)

(58) Field of Classification Search
CPC . B25J 9/1676; B25J 9/162; B25J 9/163; B25J 9/1651; B25J 9/1666; B25J 13/089; B25J 19/06; B25J 5/007; G05B 2219/40201; G05B 2219/40202; G05B 2219/40219
See application file for complete search history.

(56) References Cited

U.S. PATENT DOCUMENTS

| | | | |
|---|---|---|---|
| 2020/0326721 A1 | 10/2020 | Buerkle et al. | |
| 2022/0234209 A1* | 7/2022 | Kriveshko | ............. B25J 9/1697 |

OTHER PUBLICATIONS

Yoon et al., Robot Remote Control Method and System, and Building in Which Robot Robust Against Communication Latency is Driven, Jul. 2, 2021 (Year: 2021).*

(Continued)

*Primary Examiner* — Adam R Mott
*Assistant Examiner* — Heather J Keniry
(74) *Attorney, Agent, or Firm* — Viering, Jentschura & Partner mbB

(57) ABSTRACT

Disclosed herein are systems, devices, and methods of a safety system for analyzing and improving the safety of environments that may be shared between robots and humans. The safety system may receive a safety envelope that includes a reachable set of locations at an expected position of an object at a prediction time. The receiver may also receive a perception prediction that may be based on the safety envelope and may include environmental information associated with the object at the expected position at the prediction time. The safety system may also include a processor that generates an instruction to move a robot according to a safe movement instruction based on whether a perception check exceeds a predetermined threshold, wherein the perception check may be based on a difference between the perception prediction and sensor information indicative of the environment of the object at the prediction time.

25 Claims, 10 Drawing Sheets

(56)     References Cited

OTHER PUBLICATIONS

Cornelius Buerkle et al., "Towards Online Environment Model Verification", 2020 IEEE 23rd International Conference on Intelligent Transportation Systems (ITSC), Jul. 1, 2020, IEEE.
Domenico D. Blois et al., "Context in robotics and information fusion", Context-Enhanced Information Fusion: Boosting Real-World Performance with Domain Knowledge, 2016, pp. 675-699.

* cited by examiner

700

733

715b

713c

702

715c

720

701

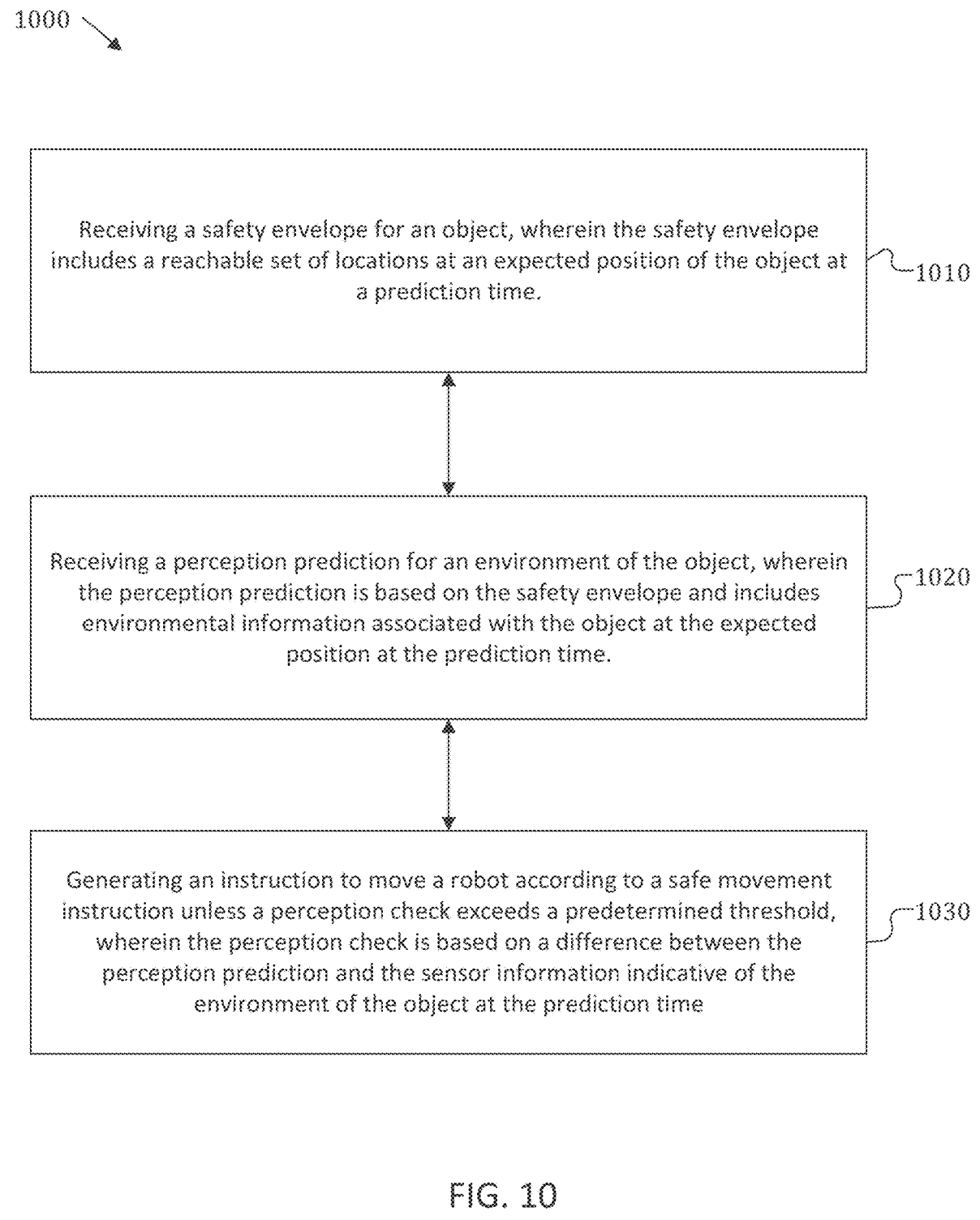

1000

Receiving a safety envelope for an object, wherein the safety envelope includes a reachable set of locations at an expected position of the object at a prediction time. ⎯1010

Receiving a perception prediction for an environment of the object, wherein the perception prediction is based on the safety envelope and includes environmental information associated with the object at the expected position at the prediction time. ⎯1020

Generating an instruction to move a robot according to a safe movement instruction unless a perception check exceeds a predetermined threshold, wherein the perception check is based on a difference between the perception prediction and the sensor information indicative of the environment of the object at the prediction time ⎯1030

FIG. 10

TASK IMPACT ZONE AND 4-DIMENSIONAL SAFETY ENVELOPE FOR ROBOTS

TECHNICAL FIELD

The disclosure relates generally to robot safety, and in particular, to systems, devices, and methods that relate to robot safety in environments where there may be other humans in the vicinity of and/or collaborating with a robot.

BACKGROUND

Autonomous robots are becoming increasingly widespread in work and personal environments. As the number of robots in such environments increases, so does the risk of hazardous interactions among robots and humans in shared spaces. Due to their size and cost, many robots may have limited sensing, processing, and decision-making capabilities, which means that they have limited capability to assess, react to, and resolve the safety of a situation. To ensure safety, such robots may simply stop their planned activities when persons are nearby or when they encounter an unfamiliar constellation of objects. This may cause the robot to stop operations more frequently than would be desired, resulting in decreased efficiency for robots that share working spaces with persons or other moving objects.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which:

FIG. 10 depicts an exemplary schematic flow diagram of a method for analyzing and improving the safety of environments shared between robots and humans.

DESCRIPTION

Figure 1:
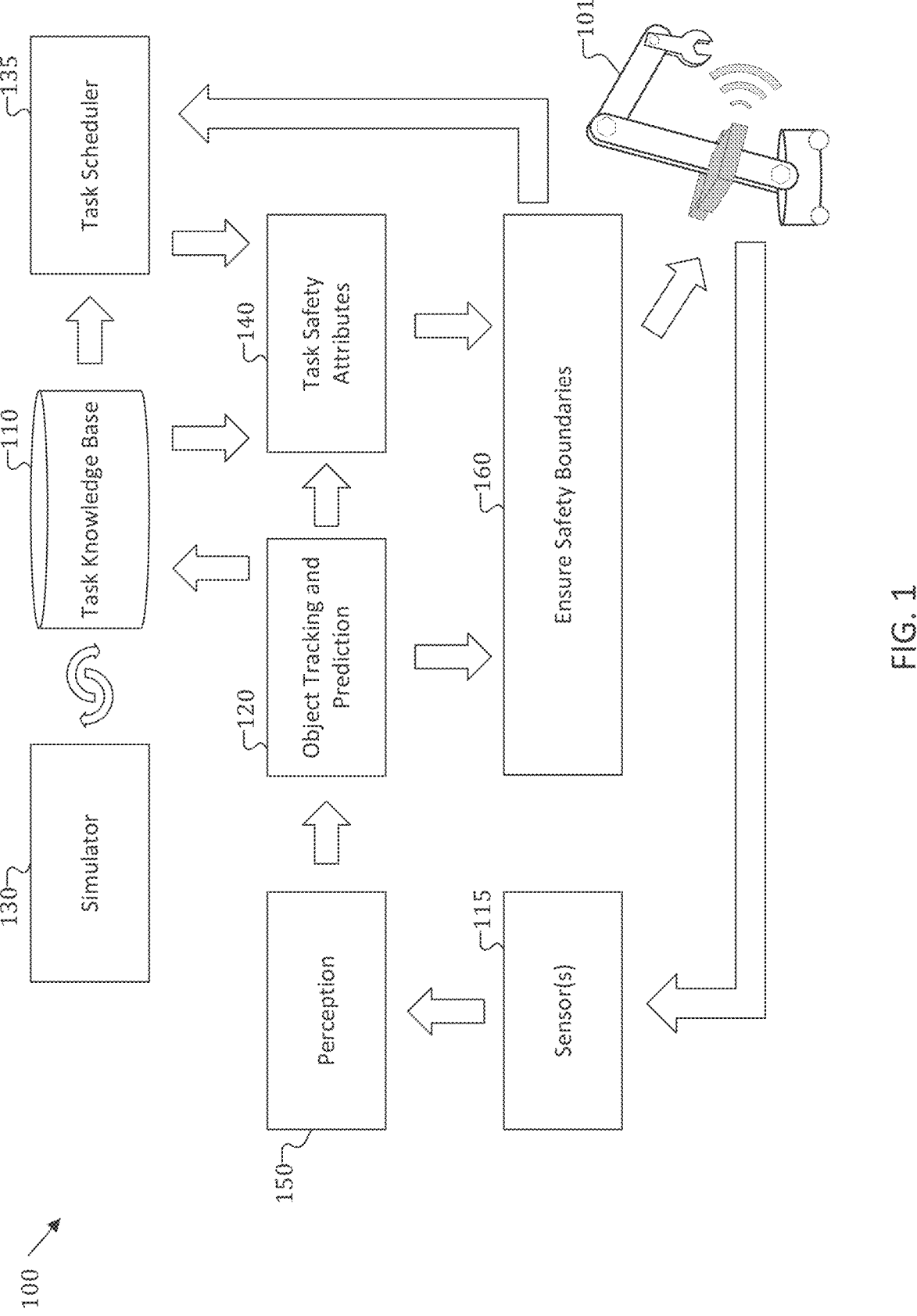
FIG. 1 shows an exemplary safety system for analyzing and improving the safety of environments in which a robot may perform work tasks near humans.

The following detailed description refers to the accompanying drawings that show, by way of illustration, exemplary details and features.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc., where "[ . . . ]" means that such a series may continue to any higher number). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc., where "[ . . . ]" means that such a series may continue to any higher number).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "robot" may be understood to include any type of digitally controllable machine that is designed to perform a task or tasks. By way of example, a robot may be an autonomous mobile robot (AMR) that may move within an area (e.g., a manufacturing floor, an office building, a warehouse, etc.) to perform a task or tasks; or a robot may be understood as an automated machine with arms, tools, and/or sensors that may perform a task or tasks at a fixed location; or a combination thereof. In addition, reference is made herein to a "human" or a "person" that may collaborate or share a space with a robot. As should be appreciated, the disclosed systems, methods, and devices, are not limited to strictly human collaborations and it should be understood that a "person" or "human" may in fact be other, non-human entities that share a space with or collaborate with a robot.

As robots become more prevalent in our daily lives, it is more likely that robots will operate in shared spaces, where aspects of the shared space may be constantly changing. This is especially true where human workers may interact with robots and may be in close proximity to a robot when it is operating. Such a situation may lead to unsafe conditions for the human and/or robot. Robots may have limited sensing, processing, and decision-making capabilities, so they may not be capable of assessing, reacting to, and resolving complex interactions to ensure a safe environment. To provide safety, conventional robots may use rudimentary safety routines that simply stop their planned activities if a person enters the room or workspace, if a complex interaction is detected, or if an unexpected situation arises. This may result in frequent stoppages in environments shared between robots and humans. In addition, unsafe situations or accidents may occur when robots interact with humans due to the unpredictable nature of humans. Using an edge-based or cloud-based server to assist the robot in assessing the safety of the environment is not an ideal or reliable solution because communication latencies may exist between the robot and the edge. Such latencies may cause the edge-processed safety assessment to be out of date with respect to the current situation, which means such system needs to be highly conservative in its safety assessment to account for the potential latencies.

As should be apparent from the detailed disclosure below, the disclosed safety system may improve robot safety in workspaces shared between robots and humans. According to certain aspects, the improved safety system may select robot tasks based on how the selected task may impact the safety of the other objects (e.g., humans) in the workspace/environment. This means the robot need not necessarily stop operating if a person enters the room or nears the robot. Instead, the robot may adapt its task to conform to the changes in the environment, taking into account not just the motion required for the task but also the potential safety impact to the larger environment, including to other humans that may be nearby and impacted by the robot's task. According to certain aspects, the system may also provide for advanced safety at a lower cost by offloading certain aspects of the safety envelope calculations to a cloud-based server while also accounting for potential latency in communications between the cloud and the robot. The system may adapt the robot's behavior to narrowly address those risks without enforcing an overly conservative safety margin to account for the latency and without necessarily fully stopping operation. As a result, the robot may enjoy fewer stoppages in shared environments while also maintaining a safe working environment.

FIG. 1 shows a safety system 100 for analyzing and improving the safety of environments in which a robot (e.g., robot 101) may perform work tasks near humans. Safety system 100 may make a situational-aware risk assessment of the tasks, utilizing a knowledge base of tasks, the task's safety attributes, and the task's potential impact on the current situation of the work environment, especially with respect to humans that may be impacted by the work task. Importantly, the safety system 100 may extend the work task definition to be associated with specific safety attributes, including an impact zone, objects allowed in the vicinity of the task, and movement restrictions that may be associated with the current environment and constellation of objects within the environment. This may narrowly tailor the safe operating boundaries to the particular tasks and the particular constellation of objects within the environment, and the safety system 100 may also select the robot's work task to proactively conform to the task to the current conditions of the environment.

Safety system 100 may be implemented as a device with a processor that is configured to operate as described herein. The device may operate as part of a server that is remote to the robot (e.g., a cloud-based server), may be integrated into the robot, and/or may have processing/sensors that are distributed across various locations. The safety system 100 may include a receiver, transmitter, and/or transceiver for communicating information among the various processing locations (e.g., between robot and the cloud).

Safety system 100 may include any number of components for processing safety-related information, including, components for defining tasks and their associated safety attributes, for creating, simulating, and updating a task knowledge base, for selecting and scheduling safety-aware tasks for robot 101, and for instructing robot 101 to execute selected tasks while monitoring the environment to maintain safety boundaries. For example, safety system 100 may include a task knowledge base 110 that contains robot tasks and safety-related information associated with each task. Safety system 100 may use simulator 130 to analyze potential hazards associated with a given task and an associated constellation of observations about the environment. The simulator 130 may continuously update the task knowledge base 110 based on observations of the actual environment and any deviation from the simulation.

The safety system 100 may collected sensor information from sensor(s) 115 for use in a perception module 150 that fuses and interprets the sensor information into an environment-wide view of objects within the environment. As should be appreciated, sensor(s) 115 may be located on robot 101, be located in the environment (e.g., part of the infrastructure), and/or received (e.g., via a receiver) from other robots and/or other sensors that are a part of or remote to safety system 100. Such sensors may include, as examples, a depth sensor, a camera, a radar, a light ranging and detection (LiDAR) sensor, a motion sensor, a gyroscopic sensor, an accelerometer, and/or an ultrasonic sensor. As should be appreciated, safety system 100 may utilize any type of sensor to provide the received sensor information about the environment. As should also be appreciated, safety system 100 may store safety-related processing information (e.g., sensor data, simulation results, data in the task knowledge base 110, task data, object data, perception data, prediction data, safety data, safe boundary data, program instructions, etc.) in a memory in order to facilitate storage and transfer of the information.

Safety system 100 may use the environment-wide view of objects within the environment in an object tracking and prediction module 120 that monitors the constellation of objects within the environment and to make predictions about how the objects may progress along their trajectories or move within the environment. The object tracking and prediction module 120 may provide information to the task knowledge base 110. Safety system 100 may also have a task scheduler 135 that maintains a list of possible and current tasks for robot 101. For each task in the task scheduler 135, the safety system 100 may obtain, in module 140, the task safety attributes from task knowledge base 110 that may be associated with each possible/current task for the current object observations and predictions. In module 160, safety system 100 may utilize the information from the object tracking and prediction module 120 and the task safety attributes module 140 to analyze how the objects may interact with the robot, how the robot's movements might impact the objects, generate appropriate movements or movement modifications for robot 101 that will ensure safe boundaries, and/or request a new task from the task scheduler 135 that will be able to ensure the robot maintains safe boundaries during the task.

As should be appreciated, a robot may be configured to execute different work tasks within their work environment in furtherance of a particular goal or mission. A household robot, for example, may have a household chore mission, where the robot might perform tasks such as cleaning, cooking, returning items to designated locations, setting the table, removing food items from the table, etc. A supermarket robot, for example, may have a broader service-oriented mission, where the robot's tasks may include moving goods, restocking shelves with goods, separating expired/damaged goods, cleaning, assisting customers with lifting a heavy object, assisting customers in removing a selected items from a shelve to place it in the shopping cart, etc. For any given task, each task may have a different impact on the safety of the humans and objects in the surrounding environment and a different level of interaction/monitoring required by the task. For example, some tasks may be associated with a high risk of severe injury to persons within the vicinity (e.g., lifting large, heavy pallets of goods onto a high self). Other tasks, may be associated with a lower risk of injury to persons within the vicinity (e.g., transferring a beverage crate into a shopping cart).

Figure 2:
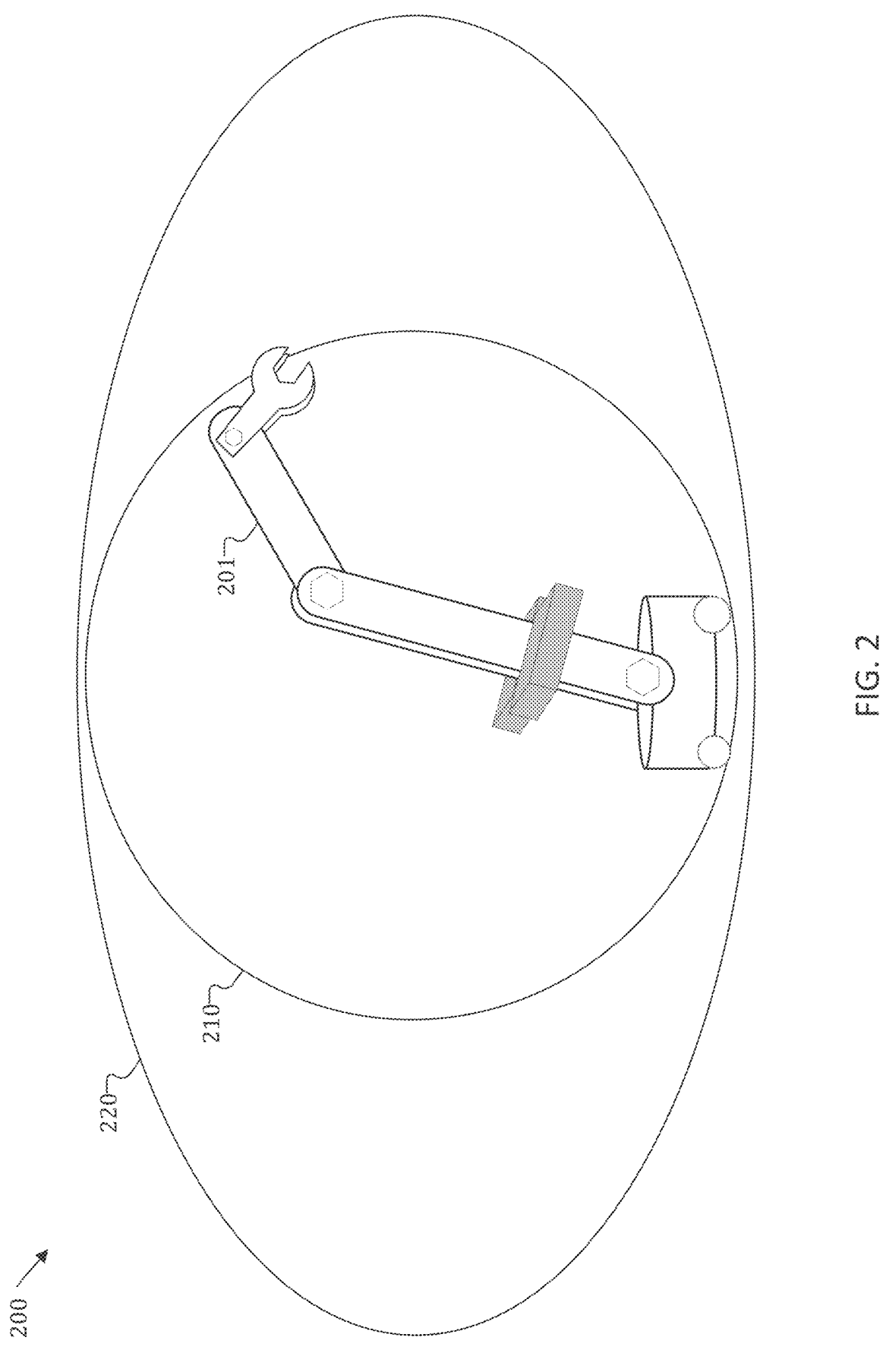
FIG. 2 shows an exemplary collision zone compared to an exemplary impact zone for a robot.

Current robot safety systems, however, do not take into account the safety attributes of the task to nearby persons (e.g., the impact of the task on nearby humans), and they instead focus on collision avoidance. As shown in FIG. 2 for example, robot 201 may have a collision zone 210 that is defined by the reachable area around robot 201 associated with its task movements. In other words, if an object is within collision zone 210 during a movement of robot 201, it may collide with the object. However, a collision zone alone may not provide a sufficient safety area for the given task and for the current environmental conditions. By contrast, the safety system described herein may consider the safety attributes of the task and how the task may impact nearby humans in order to define a larger "impact zone" (e.g., impact zone 220) that should be maintained for safety purposes. As shown in FIG. 2, for example, impact zone 220 may be larger than the collision zone 210 because it may take into account a variety of safety attributes associated with the task, including, for example, the type of task (e.g., the severity/hazard rating of dangers associated with the task) and the current environment (e.g., nearby objects/humans, whether the objects are allowed in the environment, the objects' expected trajectory in light of the robot's expected movements, etc.).

The size of the impact zone for a given task may start with the reachable set associated with the motions of the robot for the given task, but it may extend further based on other factors. For example, if the task to move dangerous goods (e.g., a household robot carrying a pot of boiling water), the impact zone may be larger than just the reachable set of locations associated with the movement and may extend to a safe distance associated with, for example, a potential spillage area that may project beyond the movement area (e.g., the boiling water may splash or spill outside of the trajectory of the robot's movement). As another example, if the task for the robot is to move a heavy pallet of goods to a high location on a warehouse shelf, the impact zone may start with the area needed for the robot's lifting motions but may also extend to a "drop zone" to account for goods that may fall off the pallet at some distance away from the movement area and could cause severe injury. Furthermore, the impact zone may be extended to account for the amount of time a given task may take to complete while considering the movement of objects in the environment. In this sense, the impact zone may take into account the expected trajectories of objects in the environment in relation to the robot's movement (e.g., widening the impact zone to be large enough to reach a safe state to account for moving objects).

In addition to impact zone, the safety system may also associate a task with a list of objects that are permitted to be nearby the robot (e.g., within the impact zone or within a given proximity to the robot) during execution of the task. Of course, the list may also be a "negative" list, meaning it contains objects that are prohibited from being nearby the robot. Such objects may be classified into object groupings, such as by an age of the person (e.g., grouped by age, where adults are permitted near the robot during the task, while teenagers and kids are prohibited), or a type of object (e.g., a pet, a human, or another robot, where other robots are permitted, and pets or humans are prohibited), or other groupings/classifications of the objects (e.g., grouped by material type, where a class of flammable materials may be prohibited when the task is to operate a stove). As another example, the safety system may group/classify the permitted/prohibited objects based on the level of training a person may have or whether the system has identified the person (e.g., as an employee). Thus, the system may permit a recognized supermarket person to be at a closer distance to a supermarket robot tasked with stocking a shelf, whereas the system may not permit untrained supermarket personnel or non-employees to be at as close of a distance. Further attributes may also impact this distance. For example, if the robot's restocking task involves highly dangerous goods or the restocking is to a very high shelf, the system may increase this distance—even for trained supermarket personnel—because of the increased severity associated with the restocking task.

In addition to impact zone and permitted persons/objects, the system may also associate other safety-relevant attributes to each task. For example, this may include certain motion restrictions of the robot when performing the task (e.g., to restrict speeds, forces, accelerations, the operation area of the manipulator, etc.). As noted earlier, the safety system may not only consider the objects currently within the impact zone, but may also consider the predicted position of a given object at a later point in time relative to the robot's current motion. Thus, the safety system may predict trajectories of the object (e.g., the likely movements of a nearby human) to determine the impact zone and/or to ensure that the human will not breach the task's safety envelope (e.g., impact zone).

Figure 3:
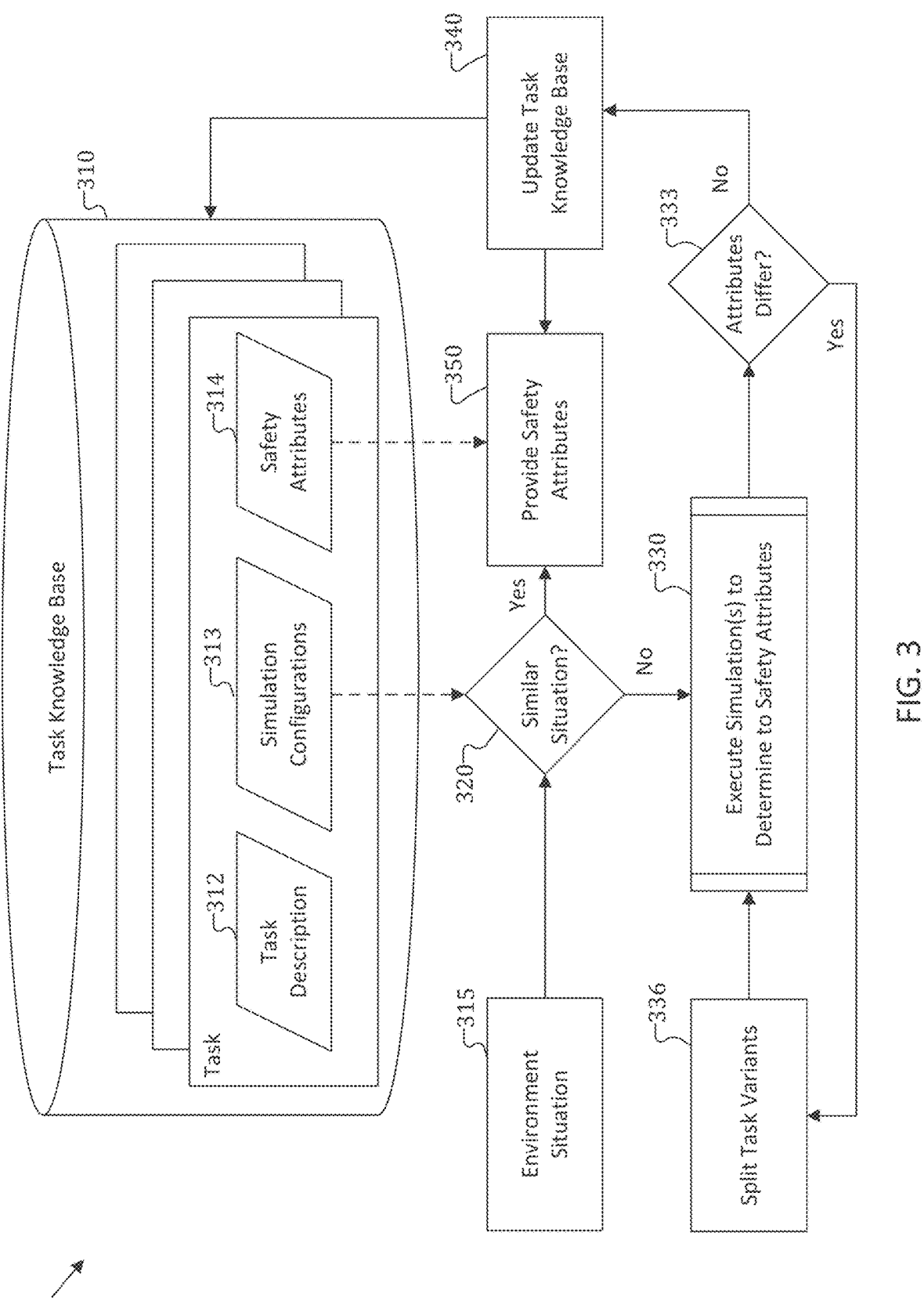
FIG. 3 depicts an exemplary update procedure for a task knowledge base of a safety system for environments in which a robot may perform work tasks near humans.

FIG. 3 shows an update procedure 300 for a task knowledge base 310 of a safety system for analyzing and improving the safety of environments in which a robot may perform work tasks near humans. It should be appreciated that FIG. 3 is merely exemplary and is not intended to limit safety system 100, which may be implemented in any number of ways and may have any or none of the aspects discussed below with respect to update procedure 300.

As shown FIG. 3, the task knowledge base 310 for the safety system (e.g., safety system 100 described above with respect to FIGS. 1 and 2) may contain a number of robot tasks, each associated with safety-related information. The safety-related information for each task may include, for example, a task description 312, simulation configuration(s) 313, and/or safety attributes 314 associated with the task. The safety attributes 314 may include, for example, the impact zone for the task, persons/objects that are permitted/prohibited, and/or motion restrictions for the robot. The simulation configuration(s) 313 may include, for example, the objects and persons within the environment of the robot (including their expected/predicted motion models (e.g., predicted trajectories), the considered parameters associated with the task (duration, efficiency, speed, etc.), and/or the considered hazards associated with the task.

The update procedure 300 may populate the task knowledge base 310 with an initial set of tasks and the associated safety-related information from expert knowledge (e.g., initial assumptions about the robot) based on the goal/ mission of the robot and the possible tasks expected of the robot in various anticipated environmental situations.

Because the specific boundaries of the impact zone may depend on the environmental situations encountered by the robot and the anticipated hazards, update procedure 300 may use a simulator (e.g., simulator 130 discussed with respect to FIG. 1 above). The update procedure 300 may determine the initial boundaries of the impact zone for a specific task by simulating (via a simulator) potential hazardous situations that may occur while the robot executes the task (e.g., if a robot is forced to apply an emergency brake, it may spill a hazardous liquid from an open container transported by the robot; or if a robot changes the lift speed while lifting the pallet to a storage location, heavy objects may topple off the pallet). The update procedure 300 may constantly monitor the impact zone for a given task. Based on the monitored impact zone, the update procedure 300 may further group the tasks in the task knowledge base 310 by task types and according to their impact zones. Besides the impact zone, the update procedure 300 may simulate the impact different types of objects may have on a given task and its associated safety attributes to determine what objects and/or object types may be include in the list of permitted/prohibit objects.

In operation, the safety system may compare the current environmental situation (e.g., at 315) with the information stored in the task knowledge base 310 to determine (e.g., in 320) if a similar situation configuration already exists in the task knowledge base 310 for the current environmental situation. As should be appreciated, the initially populated data in the task knowledge base 310 may not account for all real-world situations that a robot may experience when actually executing a given task. Therefore, the safety system may need to dynamically verify the current situation against the information stored in the task knowledge base 310. This verification (e.g., in 320) may be performed by the robot before the task execution starts. If the safety system is unable to verify a match to an existing situation, the safety system may simulate (e.g., in 330) multiple hazardous situations based on the task and a digital twin of the environment in which the robot is currently operating. The safety system may perform this simulation at an edge/cloud-based server, given that the robot itself might have limited processing capabilities to do much more than verify whether the current environment matches an existing simulation configuration.

The update procedure 300 may also make an intra-simulation comparison (e.g., in 333) of the various hazards to determine whether the safety attributes associated with the different simulation runs have a high deviation from one another (e.g., the impact zone for certain hazards have boundaries that are much wider than for other hazards). If so, this may mean that the safety attributes for such tasks may be overly conservative (e.g., the task may have a wider impact zone than is necessary) because the task entry in the task knowledge base 310 covers too many variants. As a result, the update procedure 300 may split the task so that it has different entries in the task knowledge base 310 for different variants of the task. The update procedure 300 may then re-run the simulations to determine the safety attributes, re-checking if the attributes have a large deviation, and re-splitting the task until the update procedure 300 reaches an acceptable deviation among simulation runs.

The update procedure 300 may take the results of the simulation runs to update (e.g., in 340) the task knowledge base 310 with the newly simulated hazards for the environment. In this manner, the update procedure 300 continuously adds to and updates the task knowledge base 310 as the robot experiences new environmental situations. As the update procedure 300 updates task knowledge base 310, the safety system may be able to more quickly obtain (e.g., in 350) the corresponding safety attributes associated with the task for new environments because safety system may obtain it directly from the task knowledge base 310 instead of from the simulator. Over time, the task knowledge base 310 may become standardized as the system learns what types of tasks, objects, environments, and hazards a robot is likely to encounter.

Referring back to FIG. 1, the safety system 100 may select and schedule tasks (e.g., in task scheduler 135) based on the environment and perceived (e.g., determined) information about the environment (e.g., detected persons/objects and their associated predictions/trajectories for movement) and the safety attributes associated with the environment. In this regard, safety system 100 may use the perceived information about the persons/objects (e.g., predicted future movements) to analyze whether the robot is able to safely execute the currently scheduled task within the environment. If not, the safety system 100 may assign a new task to the robot. For the new task, the safety system 100 may again query the task knowledge base 110 to determine if a constellation of environmental variables exists in the task knowledge base 110 that match the current environment. If the safety system 100 finds a near match, it retrieves the corresponding safety attributes (e.g., impact zone, permitted/prohibited object list, etc.) and verifies that none of the objects create a conflict in the impact zone. In case of a conflict, the safety system 100 may postpone the task, modify the movements associated with the task, and/or again request a new task from the task scheduler 135. If the safety system 100 cannot find a sufficient match for the constellation of environmental variables in the task knowledge base 110, the safety system may perform simulations (as discussed above with respect to the update procedure 300) to cover the new constellation of environmental variables.

As should be appreciated, the safety system 100 may continuously monitor (in 160) the current environment to confirm that the monitored environment continues to conform to the necessary safety attributes (e.g., detected objects do not breach to the impact zone, the robot's motion is limited to the associated motion restrictions, the persons/objects have moved according to their predicted trajectories, etc.). The continuous monitoring may be real-time, at regular intervals, at irregular intervals, and/or triggered by an event (e.g., alarm-based, motion detection, etc.). If the current environment no longer conforms to the necessary safety attributes, the safety system may generate a mitigating instruction to mitigate the risk. The mitigation instruction may include, for example, an instruction to slow the speed of the robot's movements, an instruction to change the movement plan (e.g., the trajectory), an instruction to stop the robot's movements and/or interrupt the task, an instruction to provide an audible and/or visual warning message to alert the person/object about the danger, etc.

In addition, the safety system 100 may continuously monitor (e.g., in 160) the current environment in order to re-obtain the safety attributes (e.g., in 140) for the current situation. For example, the task knowledge base 110 may have task safety attributes for the new situation that provides acceptable operational parameters for the robot with different motion restrictions (e.g., a reduced speed for the robot's arm movements) that provide acceptable operational attributes to perform the task in the current environment. In this manner, as the environment changes, the robot may continuously adapt its motions to match the need of the current environment. As should be appreciated, this means the safety system may also lift restrictions (e.g., determine safety attributes that are less restrictive (e.g., allowing a faster robot motion)) after the safety of the environment has improved (i.e., the person has now moved away from the robot and out of the impact zone). For example, the safety system 100 may reduce the robot's speed when a person walks inside the impact zone. The reduced speed may reduce the size of the impact zone, meaning that while the robot operates at the lower speed, the person remains outside of the impact zone. If the person walks away from the robot, the safety system 100 may increase the robot's speed because with the person gone, there may no longer be a need to maintain a narrower impact zone.

Figure 4:
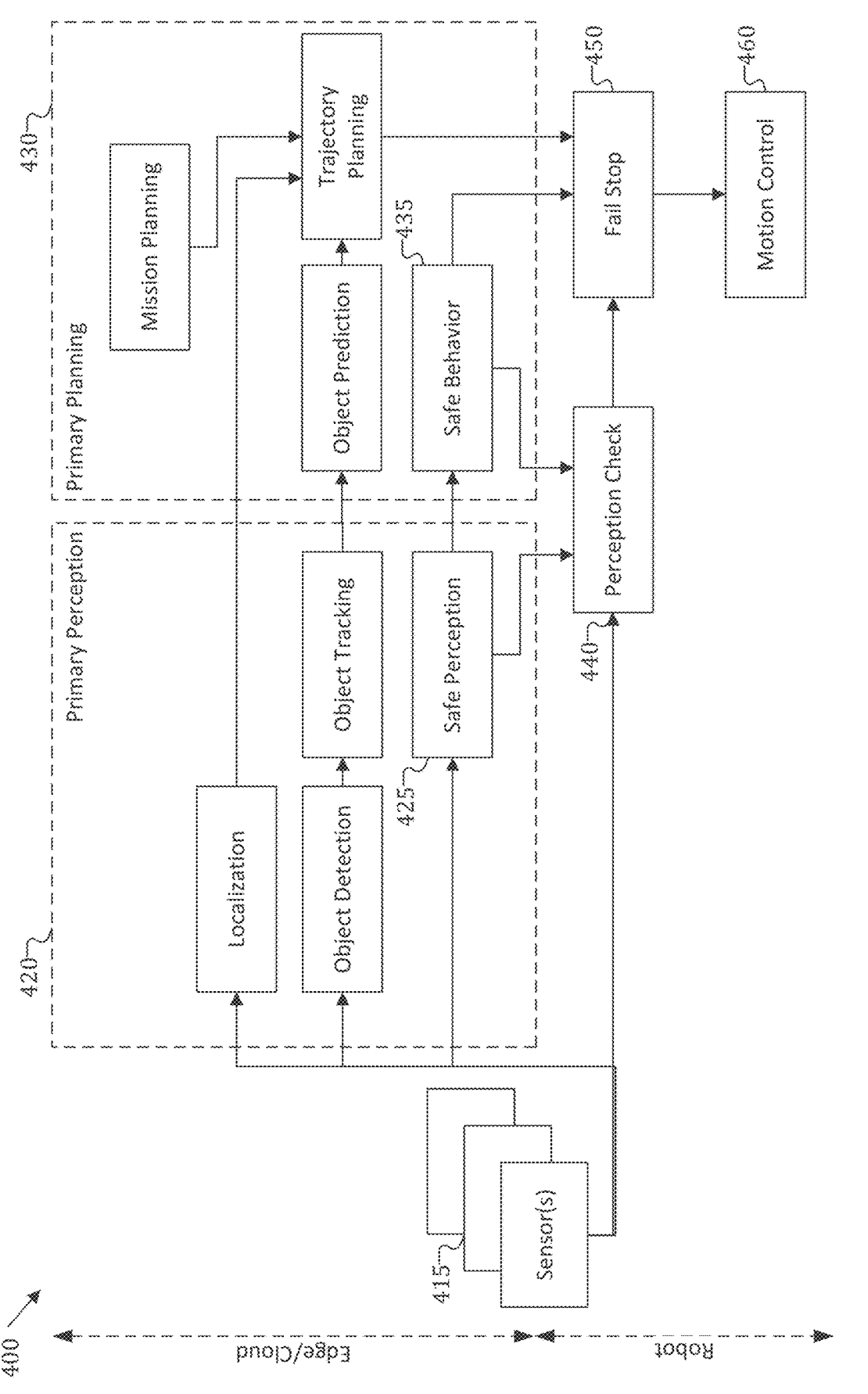
FIG. 4 depicts an exemplary safety system for determining a four-dimensional (4D) safety envelope for environments in which a robot may perform tasks near humans.

FIG. 4 shows a safety system 400 for determining a four-dimensional (4D) safety envelope for improving the safety of environments in which a robot may perform tasks near humans. It should be appreciated that FIG. 4 is merely exemplary and is not intended to limit safety system 100 or update procedure 300 which may be implemented in any number of ways and may have any or none of the aspects discussed below with respect to safety system 400.

As noted earlier, robot safety systems, including safety system 100 and/or update procedure 300, may be processed on an edge or cloud-based server that is remote to the robot. Offloading the processing from the robot to the edge server may have an advantage of lowering the cost of the robot, but it may also increase the risk of potential communication latencies and/or failures between the cloud and the robot that may lead to overly-conservative safety margins (e.g., a larger safety envelope) to accommodate potential latencies. Instead of increasing the size of the safety margin to address potential latencies, safety system 400 may use a 4D safety envelope that may more narrowly address those risks without requiring an overly conservative safety margin. In certain aspects, the safety system may execute safety-related processing partly on the edge/cloud-based server and partly on the robot, and the safety system may extend the concept of a safety envelope to dynamic environments by predicting the behavior of the environment at future points in time. As a result, the robot may enjoy fewer stoppages in environments shared with humans while also maintaining a safe working environment.

Safety system 400 may be implemented as a device with a processor that is configured to operate as described herein. The device may operate as part of a server that is remote to the robot (e.g., a cloud-based server), may be integrated into the robot, and/or may have processing/sensors that are distributed across various locations. The safety system 400 may include a receiver, transmitter, and/or transceiver for communicating information among the various processing locations (e.g., between robot and the cloud). As shown as a non-limiting example in FIG. 4, the safety system 400 may have distributed processing, where some portions operate on edge/cloud server(s) and some portions operate on the robot. For example, safety system 400 may operate primary perception system 420 and primary planning system 430 in the edge/cloud, while safety system 400 may operate a perception check 440 at the robot for issuing fail stop instructions (of fail stop system 450) and/or motion control instructions (of motion control 460). It should be appreciated that the distribution between edge/cloud and the robot of the processing shown in FIG. 4 is exemplary, and other distributions may be used. As should be appreciated, safety system 400 may store safety-related processing information (e.g., sensor data, localization data, object data, perception data, prediction data, safe behavior data, safe boundary data, mission planning data, motion control data, program instructions, etc.) in a memory in order to facilitate storage and transfer of the information.

As shown in FIG. 4, the primary perception system 420 may receive sensor information from any number of sensors 415. As should be appreciated, sensor(s) 415 may be located on the robot, be located in the environment (e.g., part of the infrastructure), and/or received (e.g., via a receiver) from other robots and/or other sensors that a part of or remote to safety system 400. Sensor(s) 415 may include, as examples, a depth sensor, a camera, a radar, a LiDAR sensor, a motion sensor, a gyroscopic sensor, an accelerometer, and/or an ultrasonic sensor. As should be appreciated, safety system 400 may utilize any type of sensor to provide the received sensor information about the environment.

The safety system 400 may fuse the sensor information from the sensor(s) 415 in the primary perception system 420 to perform localization of the robot, object detection, and object tracking. In addition, system 400 may fuse the sensor information from sensor(s) 415 to determine a safe perception 425. The safe perception 425 may be understood as a perception prediction (e.g., predicted values for sensor information) at a given position for an object at a given point in time (e.g., a prediction time) since receiving the original sensor information. As will be discussed later, the safe perception 425 for the prediction time may be checked by a perception check 440 using new sensor information obtained about the environment at (e.g., near) the prediction time to ensure the perception prediction was correct.

In addition, safety system 400 may also have a primary planning system 430 that may perform mission planning of the overall goals for the robot, make object movement predictions for the detected objects, determine trajectory plans for the robot based on the mission plan, and determine a safe behavior 435 for the robot. The safe behavior 435 may be understood as a robot movement or movements that conform to a given safety envelope for the environment (e.g., a reachable set of locations of objects in the environment of the robot) at a given point in time (e.g., at each predicted point in time). Safety system 400 may determine the safe behavior 435 based on the fused sensor information and/or the safe perception 425.

Safety system 400 may then send the safe perception(s) 425, the safe behavior(s) 435, and the trajectory plan(s) to the robot for execution of the particular tasks and the appropriate times. The safety system 400 may perform a perception check 440 using new sensor information obtained about the environment at (e.g., near) the prediction time to ensure the perception prediction was correct. The sensor information may be collected from any number of sensors 415, which, as noted above, may be located on the robot, may be in the environment (e.g., part of the infrastructure), and/or may be data received (e.g., via a receiver) from other robots and/or other sensors that are a part of or remote to safety system 400. The perception check 440 may ensure the accuracy of the predicted values for the sensor information of the environment for the given position at the given point in time (e.g., the prediction time(s) associated with safe perception 425). If the perception check 440 indicates that the environmental prediction was inaccurate (e.g., the perception check 440 exceeds a predetermined threshold of inaccuracy), the fail stop system 450 may stop or modify the planned motion (e.g., perform a safety maneuver, slow down the motion, steer the robot to a new location, rotate the robot's manipulators along a different trajectory, etc.) by issuing a mitigating instruction to the robot's motion control system 460. In addition, the perception check 440 may use the new sensor information obtained about the environment at (e.g., near) the prediction time to ensure the planned motion still conforms to the safe behavior 435 (e.g., the robot's planned movement remains safe in light of the actual locations of objects).

The perception check 440 may help mitigate communication delays in a distributed system (e.g., received data may be corrupted and needs to be retransmitted and/or communications channels may be blocked or busy when communicating data from one part of the system to another). Thus, if the safety system 400 determines the safe perception 425 and/or safe behavior 435 on a server remote to the robot, there may be a delay (e.g., latency) from the time the sensors of the safety system 400 obtains the sensor data to the time the robot executes the corresponding movement instruction based on that sensor data. The expected latency (from sensing at the sensor to a movement of robot) generally relates to the overall system response time, where the system may require a certain minimum overall system response time to avoid a collision (e.g., between a robot's movement and another object in the environment) within this time horizon. Assume, for example that a system response time $\delta$ (e.g., 500 ms) is the delay from data creation at the sensors $(t_0)$ until command execution on the robot $(t_0+\delta)$. As a result, this latency or delay may be factored into what safety system 400 considers a safe behavior 435 and when safety system 400 validates in perception check 440 that the current environment for the planned robot motion remains a safe. As noted above, this latency may increase with communications delays, and the safety system 400 may need to account for an assumed worst-case latency. While it may be possible to simply extend the object's reachable set to account for this delay, this would make the system overly-cautions, because as the assumed worst-case latency increases, the reachable set may increase significantly for a given object, thereby reducing the available safe behaviors/movements for the robot. As discussed in more detail below, safety system 400 may use a 4D safety envelope to avoid an overly-cautious determination of safe behaviors 435 while also keeping the robot safe.

To understand the 4D safety envelope, it is important to understand how safety systems typically determine safe motion. Typically, a state between to dynamic objects is considered "safe" if the distance between objects is such that the objects have sufficient time to adjust their motion to avoid a collision. This may be considered a "safe" distance and may need to account for (1) the fact that the robot will continue its motion during system response time to execute the movement instruction (e.g., receiving a stop instruction) and (2) after executing the movement instruction, the time needed for the robot's movement to make the required adjustment (e.g., the stopping distance). While this has been described as a safe distance, this concept should be understood more broadly to calculate any number of safe behaviors.

For a robot with a planned trajectory, a safety system may calculate the safe distance by simply determining a prediction of the motion along the robot's planned trajectory. For objects in the environment with unknown intentions (e.g., an unknown trajectory) the predicted motion is more complex, and the safety system may use a reachable set for the object given its current state. The reachable set may thus include all of the possible motion deviations of an object within a particular time (e.g., within the system response time). Once the safety system has determined the reachable set, the safety system may determine that the robot motion is safe as long the robot's predicted motion along the planned trajectory does not conflict with a reachable set of any object in the environment.

As should be appreciated, the reachable set for an object increases as a function of the system response time. Thus, the longer the response time of the system, the larger the reachable set, and the lager the reachable set, the smaller the area in which the robot may make safe movements, leading to an overly-cautions system. To avoid such an overly-cautious system with large reachable sets, safety system 400 may use a 4D safety envelope that may be based on an assumed position and trajectory of an object to create a series of safety envelopes, each for a distinct point in time.

Figure 5:
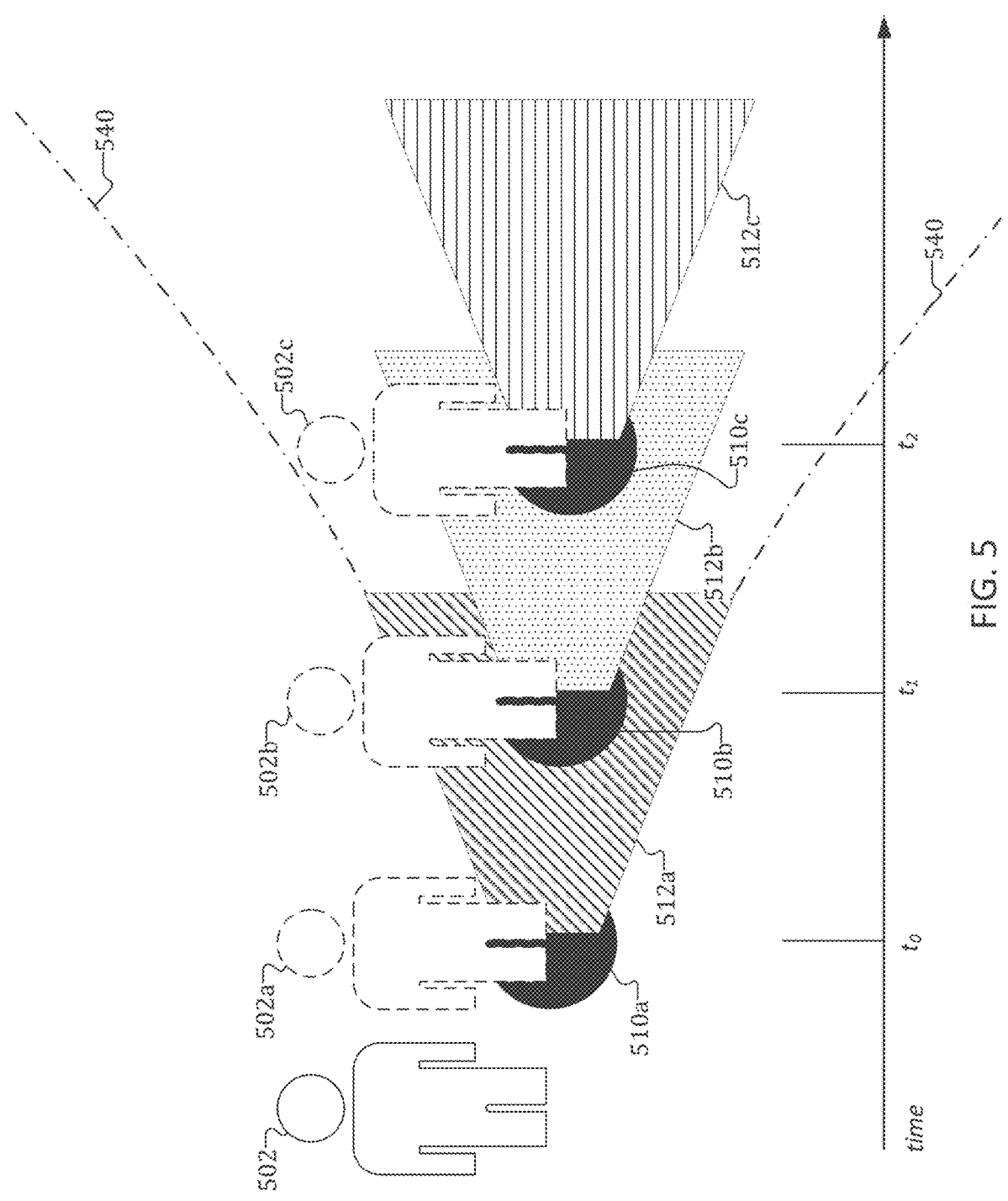
FIG. 5 shows an exemplary 4D safety envelope.

FIG. 5 shows an example of a 4D safety envelope that may be used by safety system 400 and/or safety system 100. As shown in FIG. 5, the safety system has detected object 502 at a current position and a current time. The safety system may then calculate, based on the current status of detected object 502 (e.g., its current speed, trajectory, acceleration, etc.), a reachable set 512$a$ that is associated with an expected position 510$a$ at time $t_0$ of the detected object 502 (indicated by object outline 502$a$). The safety system may also calculate, based on the current status of detected object 502, a reachable set 512$b$ that is associated with an expected position 510$b$ at time $t_1$ of the detected object 502 (indicated by object outline 502$b$). The safety system may also calculate, based on the current status of detected object 502, a reachable set 512$c$ that is associated with an expected position 510$c$ at time $t_2$ of the detected object 502 (indicated by object outline 502$c$), where the 4D envelope includes each of the predicted reachable sets (512$a$, 512$b$, and 512$c$) for the expected position of the object at the given time. As should be appreciated, FIG. 4 is merely an exemplary 4D safety envelope, and a 4D safety envelope may be any number of shapes, may account for any types of object motions, and may encompass any number of time periods.

Also shown on FIG. 5 is outline 540, which shows the outline of the classic (e.g., a three dimensional) reachable set based on a single reachable set for the entire time period. As should be appreciated, the area for the classic reachable set is much larger compared to the smaller, 4D reachable sets. This means that the 4D reachable set is more narrowly tailored to the predicted situation at the specific time period (e.g., the system response time may be divided into smaller intervals of $t_0$, $t_1$, $t_2$, etc.), allowing more space for the robot to make safe movements. As should be appreciated, the safety system may determine and utilize the 4D reachable set for a much longer time period (e.g., to account for very long communication latencies in the system) as compared to a classic reachable set, which would grow drastically large when planning for very long latency times.

Returning to FIG. 4, safety system 400, for example, may determine such 4D reachable sets as part of the safe behavior 435, calculating each safe behavior for an associated prediction time (e.g., $t_0$, $t_1$, $t_2$ of FIG. 5). In addition, in the perception check 440, the safety system 400 may use these 4D envelops to verify that planned motion of the robot does not conflict with the safety envelope at the prediction time. To do so, the perception check 440 may determine whether the expected positions of the object (e.g., object outlines 502$a$, 502$b$, and 502$c$ of FIG. 5) at each prediction time (e.g., $t_0$, $t_1$, $t_2$ of FIG. 5) are consistent with the prediction. If the object remains consistent with its expected trajectory/ motion, the robot may continue with its planned motions. However, if the object deviates from its expected trajectory/ motion by a predefined threshold, the safety system 400 may generate a mitigating instruction in the fail stop system 450 to stop or modify the planned motion, as discussed earlier (e.g., perform a safety maneuver, slow down the motion, steer the robot to a new location, rotate the robot's manipulators along a different trajectory, etc.). Because the 4D envelops may account for the worst-case reachable set at the particular point in time, the behaviors determined by the safety system 400 for the associated time period will be safe, and thus define a safe behavior at each associated time period. In other words, because the safety system 400 determined safe behaviors associated with each time period and verified that the objects were at their expected positions (e.g., within their expected safety envelops) at the corresponding time (e.g., $t_0$, $t_1$, $t_2$ of FIG. 5) the robot may safely continue with its planned motion at the corresponding time.

In addition, while the 4D safety envelopes have been discussed above as having one threshold associated with one safety parameter (e.g., a predetermined threshold for interrupting the robot's planned motion when a collision is possible), it should be appreciated that multiple threshold levels may be used, where each threshold may be associated with a different safety parameter and/or a different mitigating instruction. For example, a first safety envelope may be based on impact zone with a mitigation instruction that slows the robot if the impact zone safety envelope is violated (e.g., exceeds a first predetermined threshold), and then have a second safety envelope based on the collision zone with a mitigating instruction that stops the motion if the collision zone safety envelope is violated (e.g., exceeds a second predetermined threshold).

Figure 6:
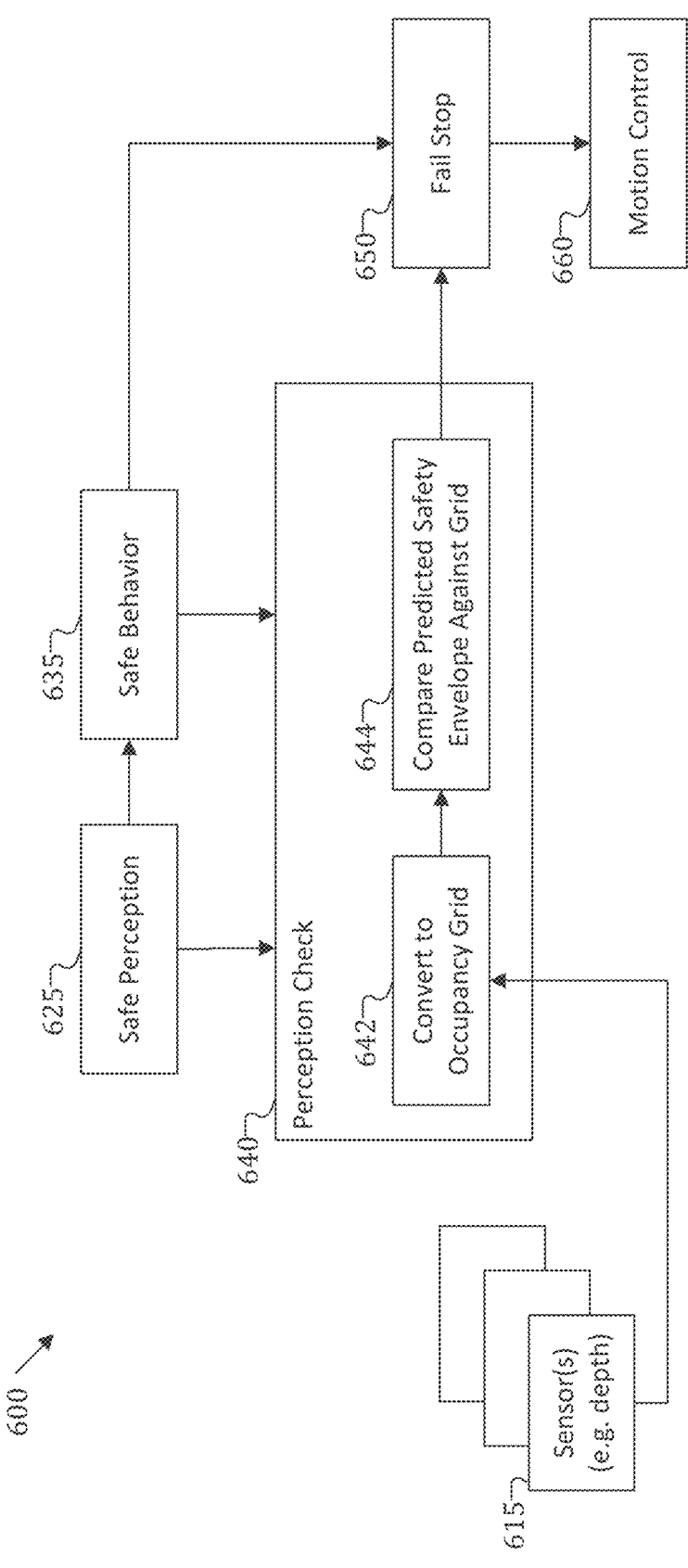
FIG. 6 illustrates an exemplary safety system that may utilize 4D safety envelopes.

FIG. 6 shows safety system 600 that may utilize 4D safety envelopes for improving the safety of environments in which a robot may perform tasks near humans, which may be, be a part of, or implement a part of safety system 400 discussed above. For example, safe perception 625 may be an exemplary embodiment of the safe perception 425, safe behavior 635 may be an exemplary embodiment of the safe behavior 435, perception check 640 may be an exemplary embodiment of the perception check 440, fail stop system 650 may be an exemplary embodiment of fail stop system 450, motion control system 660 may be an exemplary embodiment of the motion control system 460, and sensors 615 may be an exemplary embodiment of the sensors 415 described above with respect to FIG. 4. It should be appreciated that FIG. 6 is merely exemplary and is not intended to limit safety system 100, update procedure 300, or safety system 400, which may be implemented in any number of ways and may have any or none of the aspects discussed below with respect to safety system 600.

Similar to FIG. 4 discussed above, safety system 600 may include perception check 640 that may validate that the state of the environment is consistent with the assumptions made during the primary perception and planning when the safety system 600 determined the safe perception 625 and safe behavior 635. The perception check 640 may validate if the environment model used to create the trajectory plan and movement instruction for the robot remains valid for the current time using simple checks. If the perception check 640 indicates that the environment model remains valid, the originally planned trajectory and movement instructions may be executed (or continued). If the perception check 640 indicates that the environment model is no longer valid, the safety system 600 may generate a mitigating instruction. To achieve this, the perception check 640 may compare an expected environmental model received (e.g., from safe perception 625) against the current sensor data (e.g., from sensors 615, which may include, for example, a depth sensor). If the comparison remains below a predefined threshold, the perception check 640 may indicate that the environmental model is valid. If the comparison exceeds the predefined threshold, the perception check 640 may indicate that the environmental model is no longer valid.

For the comparison, perception check 640 may receive a representation of the expected environment as safe perception 625 (e.g., a different expected environment may be associated with corresponding movements, trajectories, and/or tasks for the robot) that may include a list of detected object for the current time (given the latency δ) and a 4D safety envelope for each detected object. Perception check 640 may also receive sensor data 615 that is indicative of the robot's environment, which may include a depth sensor (e.g., depth camera, a LiDAR, etc.). In 642, the perception check 640 may convert the depth information from the depth sensor to an environment representation that allows the perception check 640 to correlate the current sensor data with the received representation of the expected environment as safe perception 625. This environment representation may take the form of, for example, an occupancy grid, or any other environment representation that allows correlation of predicted object data for an environment with current sensor data for the environment. Perception check 640 may create the occupancy grid and correlate it to the safe perception 625 using conventional methods. Perception check 640 may perform this for each safety envelope corresponding to the current time (e.g., at the prediction times $t_0$, $t_1$, $t_2$ of FIG. 5).

Figure 7:
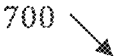
FIG. 7 depicts an exemplary occupancy grid for analyzing environments in which a robot may perform tasks near humans.

For example, an exemplary occupancy grid 700 is shown in FIG. 7 that represents a comparison of the current environment to the previously received representation of the expected environment. Robot 701 is moving with a planned trajectory (represented by arrow 720) through the environment. Occupancy grid 700 may be divided, for example, into a seven by seven grid of cells that may be occupied by objects. As shown by the darkened space at block 713c, the perception check's (e.g., perception check 440 or 640) comparison of the current environment to the previously received representation revealed an unexpected object at cell 713c, so the fail stop system (e.g., fail stop system 450 or 650) may issue a mitigating instruction to stop the robot or modify the robot's motion. For object 702, the perception check's comparison of the current environment to the previously received representation revealed object 702 was moving consistent with its safety envelope 733, and thus, cells 715b and 715c are lightly shaded to show that object 702 is occupying cells 715b and 715c as expected. As such, the fail stop system need not issue a mitigating instruction, and the robot may continue along is trajectory as previously planned.

Depending on the system latency, the perception check (e.g., perception check 440 or 640) may not have received updated safe perception information or safe behavior information (e.g., safe perception 425 or 625 and/or safe behavior 435 or 635) for the current time period. In such a situation, the perception check (e.g., perception check 440 or 640) may instead utilize the object list from the last available safe perception/safe behavior information and perform its own object prediction analysis (e.g., using a constant-velocity model, a constant-acceleration model, and/or other simple, physics-based motion models) to predict the expected positions for each object in the list. As should be appreciated, the perception check may also check for the consistent location of static objects (e.g., objects without a predicted trajectory or where the object is stationary), as this may identify errors in localization, motion command execution, and and/or sensor measurements. To the extent the predicted locations of the objects match the currently measured object locations (e.g., if the comparison remains below a predefined threshold), the perception check may indicate that the environmental model is valid. If the predicted locations of the objects do not match the currently measured object locations (e.g., if the comparison exceeds the predefined threshold), the perception check may indicate that the environmental model is no longer valid, and the fail stop system (e.g., fail stop system 450 or 650) may generate a mitigating instruction.

Figure 8:
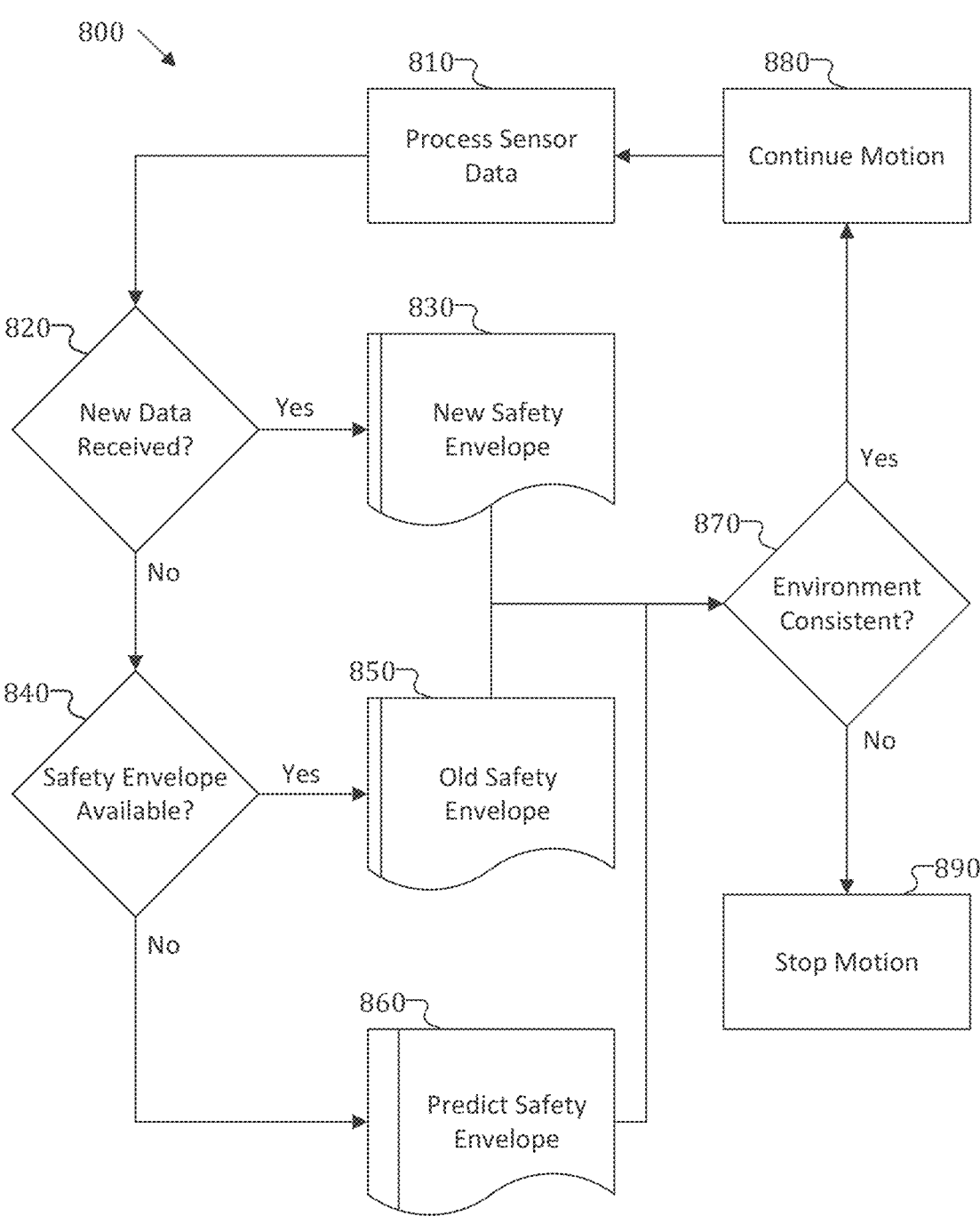
FIG. 8 illustrates an exemplary flow diagram of how a safety system may operate a perception check on environments in which a robot may perform tasks near humans.

FIG. 8 shows a flow diagram 800 of how the perception check (e.g., perception check 440 and/or perception check 640) of the safety system (e.g., safety system 100, safety system 400, and/or safety system 600) may operate. It should be appreciated that flow diagram 900 is merely exemplary and is not intended to limit safety system 100, safety system 400, or safety system 600 which may be implemented in any number of ways and may have any or none of the aspects discussed below with respect to flow diagram 800.

Starting at 810, the perception check may process sensor collected for the current time period, which it will use to compare to the safety envelope. To decide which safety envelope to use for the comparison, the perception check may in 820 check to see if it has received a new safety envelope for the given time period. If so, the perception check may, in 830 select the new safety envelope for use in 870. If the perception check has not received a new safety envelope, the process may continue to 840 to check whether an old safety envelope is available for the current time period. If so, the perception check may select this old safety envelope and provide it to 870. If the perception check has not located a suitable safety envelope (either from new data or old data), the perception check may, in 860, predict its own safety envelope by utilizing the object list from the last available safe perception/safe behavior information and performing its own object prediction analysis (e.g., using a constant-velocity model, a constant-acceleration model, and/or other simple, physics-based motion models) to predict the expected positions for each object in the list, as discussed above. Then, in 870, the perception check compares the selected (or predicted) safety envelope with the currently processed sensor data for the current environment to see if the selected safety envelope matches the current environment. If there is a match (e.g., if the differences are below a predefined threshold), the perception check allows the robot to continue its motion in 880 and the process continues for the next time period. If there is no match (e.g., if the differences exceed the predefined threshold), the perception check may generate a mitigating instruction in 890 (e.g., to stop the robot's motion or to modify the robot's motion). Of course, flow diagram 800 is merely exemplary and other logic may be used for determining when to generate a mitigating instruction. For example, in the simplest case, if the perception check fails to locate a suitable safety envelope, it may simply, rather than generating its own safety envelope, generate a mitigating instruction.

Figure 9:
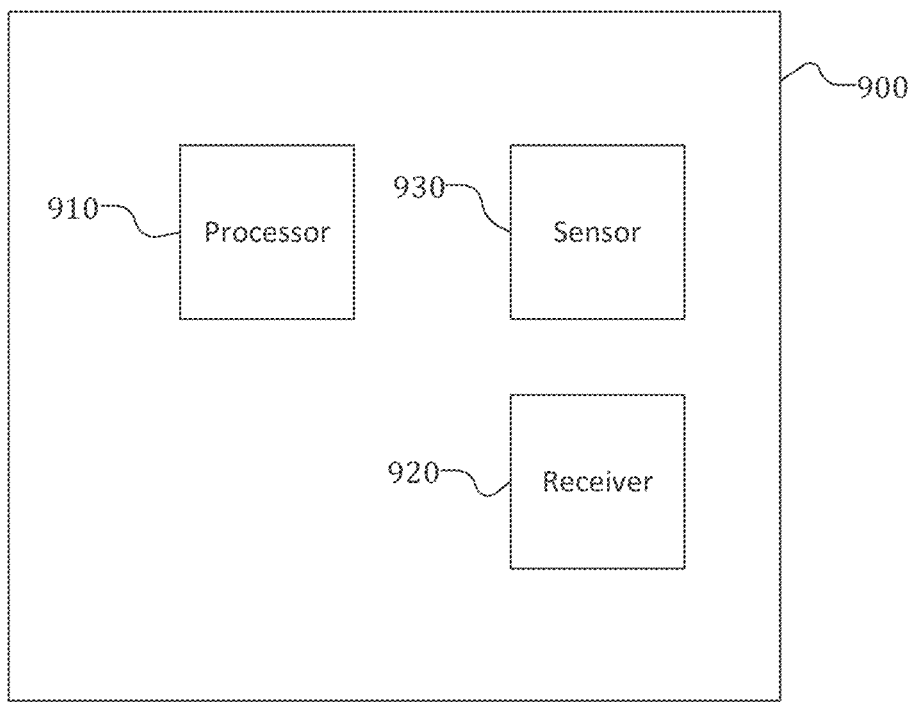
FIG. 9 illustrates an exemplary schematic drawing for a device that analyzes safety environments in which a robot may operate near other objects.

FIG. 9 is a schematic drawing illustrating a device 900 for analyzing and improving the safety of environments in which a robot may operate near other objects (e.g., humans). The device 900 may include any of the features discussed above with respect to safety system 100, safety system 400, and/or safety system 600. FIG. 9 may be implemented as a device, a system, a method, and/or a computer readable medium that, when executed, performs the features of the safety systems described above. It should be understood that device 900 is only an example, and other configurations may be possible that include, for example, different components or additional components.

Device 900 includes a receiver 920. In addition to or in combination with any of the features described in this or the following paragraphs, the receiver 920 of device 900 is configured to receive a safety envelope for an object, wherein the safety envelope includes a reachable set of locations at an expected position of the object at a prediction time. In addition to or in combination with any of the features described in this or the following paragraphs, the receiver 920 is configured to receive a perception prediction for an environment of the object, wherein the perception prediction is based on the safety envelope and includes environmental information associated with the object at the expected position at the prediction time. In addition to or in combination with any of the features described in this or the following paragraphs, device 900 also includes a processor 910 configured to generate an instruction to move a robot according to a safe movement instruction based on whether a perception check exceeds a predetermined threshold, wherein the perception check is based on a difference between the perception prediction and sensor information indicative of the environment of the object at the prediction time.

Furthermore, in addition to or in combination with any one of the features of this and/or the preceding paragraph, the object status information may include a velocity, a trajectory, and/or or an acceleration of the object. Furthermore, in addition to or in combination with any one of the features of this and/or the preceding paragraph, the receiver 920 may be configured to receive from a server that is remote to the robot at least one of the following: the safety envelope, the safe movement instruction, or the perception prediction. Furthermore, in addition to or in combination with any one of the features of this and/or the preceding paragraph, the safe movement instruction may be associated with the prediction time and based on the safety envelope. Furthermore, in addition to or in combination with any one of the features of this and/or the preceding paragraph, the device 900 may be incorporated into the robot. Furthermore, in addition to or in combination with any one of the features of this and/or the preceding paragraph, device 900 may further include a sensor 930 configured to provide the sensor information to the receiver 920. Furthermore, in addition to or in combination with any one of the features of this and/or the preceding paragraph, sensor 930 may include a depth sensor, a camera, a radar, a light ranging and detection sensor, and/or an ultrasonic sensor.

Furthermore, in addition to or in combination with any one of the features of this and/or the preceding two paragraphs, the safety envelope may include a plurality of reachable sets, wherein each reachable set of the plurality of reachable sets may be for an associated prediction time of a plurality of prediction times, wherein each reachable set may include a reachable set of locations for the object at the associated prediction time. Furthermore, in addition to or in combination with any one of the features of this and/or the preceding two paragraphs, the safety envelope for the object may include a plurality of safety envelopes for a plurality of objects, wherein each safety envelope of the plurality of safety envelopes may be for an associated object of the plurality of objects. Furthermore, in addition to or in combination with any one of the features of this and/or the preceding two paragraphs, the processor 910 may be further configured to, if the perception check exceeds the predetermined threshold, generate an instruction to modify the safe movement instruction of the robot. Furthermore, in addition to or in combination with any one of the features of this and/or the preceding two paragraphs, the instruction to modify the safe movement instruction may include an instruction to stop a motion of the robot. Furthermore, in addition to or in combination with any one of the features of this and/or the preceding two paragraphs, the instruction to modify the safe movement instruction may include an instruction to slow a motion of the robot.

Furthermore, in addition to or in combination with any one of the features of this and/or the preceding three paragraphs, the difference may include an actual object position of the object that may be different from the expected position. Furthermore, in addition to or in combination with any one of the features of this and/or the preceding three paragraphs, the prediction time may include a subinterval of an expected latency to move the robot according to the safe movement instruction. Furthermore, in addition to or in combination with any one of the features of this and/or the preceding three paragraphs, the receiver 920 may be further configured to receive the safety envelope at an update time, wherein if the perception check exceeds the predetermined threshold, the processor 910 may be further configured to generate an instruction to modify the safe movement instruction of the robot based on an elapsed time between the update time and the prediction time. Furthermore, in addition to or in combination with any one of the features of this and/or the preceding three paragraphs, the processor 910 may be further configured to generate a subsequent safety envelope for a subsequent prediction time, wherein the subsequent safety envelope may be based on an extrapolation of the safety envelope to the subsequent prediction time.

Furthermore, in addition to or in combination with any one of the features of this and/or the preceding four paragraphs, the safe movement instruction may include a selected task that may be selected from a plurality of possible tasks, wherein each possible task of the plurality of possible tasks may be associated with a safety attribute of the possible task. Furthermore, in addition to or in combination with any one of the features of this and/or the preceding four paragraphs, the safety attribute may include an impact zone of the possible task, an approved list of allowed objects allowed in the impact zone, a disapproved list of disallowed object prohibited from the impact zone, and/or a motion restriction to robot motions associated with the possible task. Furthermore, in addition to or in combination with any one of the features of this and/or the preceding four paragraphs, the impact zone may include an area around the robot that may be impacted by the robot motions associated with the possible task, wherein the impact zone may be based on a current environment of the robot and a hazard rating of the possible task. Furthermore, in addition to or in combination with any one of the features of this and/or the preceding four paragraphs, the motion restriction may include at least one of the following: a speed limit, a force limit, an acceleration limit, or a partial motion limit to the robot motions for the possible task.

Furthermore, in addition to or in combination with any one of the features of this and/or the preceding five paragraphs, the safety attribute may include a simulated safety attribute based on simulated movements of the robot in a simulated environment associated with the possible task. Furthermore, in addition to or in combination with any one of the features of this and/or the preceding five paragraphs, the simulated environment for the possible task may include a simulated trajectory of a simulated object within the simulated environment and/or a simulated hazard rating of the possible task. Furthermore, in addition to or in combination with any one of the features of this and/or the preceding five paragraphs, the receiver 920 may be further configured to receive sensor data indicative of a current environment of the robot, wherein the selected task may be selected based on a comparison of the current environment to the simulated environment. Furthermore, in addition to or in combination with any one of the features of this and/or the preceding five paragraphs, the receiver 920 may be further configured to receive sensor data indicative of a current environment of the robot, wherein the processor 910 may be further configured to generate a risk mitigation instruction based on the current environment, wherein the risk mitigation instruction may be configured to modify based on the current environment the safe movement instruction to comply with the motion restriction, to respond to an object in the current environment that may be not on the approved list or may be on the disapproved list, and/or to request a new task from the plurality of possible tasks.

Furthermore, in addition to or in combination with any one of the features of this and/or the preceding six paragraphs, the risk mitigation instruction may include at least one of the following: an instruction to reduce a speed of the robot, an instruction to change a trajectory of the robot, an instruction to interrupt the selected task, and/or an instruction to provide a warning message. Furthermore, in addition to or in combination with any one of the features of this and/or the preceding six paragraphs, sensor 930 may be configured to provide the sensor data to the receiver 920, wherein the sensor may include a camera, a LiDAR, or a radar directed to the environment of the robot. Furthermore, in addition to or in combination with any one of the features of this and/or the preceding six paragraphs, the plurality of possible tasks are stored on a sever remote from the robot.

FIG. 10 depicts a schematic flow diagram of a method 1000 for analyzing and improving the safety of shared environments between robots and humans. Method 1000 may implement any of the safety system features described above with respect to safety system 100, update procedure 300, safety system 400, safety system 600, and/or device 900.

Method 1000 includes, in 1010, receiving a safety envelope for an object, wherein the safety envelope includes a reachable set of locations at an expected position of the object at a prediction time. Method 1000 also includes, in 1020, receiving a perception prediction for an environment of the object, wherein the perception prediction is based on the safety envelope and includes environmental information associated with the object at the expected position at the prediction time. Method 1000 also includes, in 1030, generating an instruction to move a robot according to a safe movement instruction based on whether a perception check exceeds a predetermined threshold, wherein the perception check is based on a difference between the perception prediction and the sensor information indicative of the environment of the object at the prediction time.

In the following, various examples are provided that may include one or more aspects described above with reference safety system 100, update procedure 300, safety system 400, safety system 600, device 900, and/or method 1100. The examples provided in relation to the devices may apply also to the described method(s), and vice versa.

Example 1 is a device including a receiver configured to receive a safety envelope for an object, wherein the safety envelope includes a reachable set of locations at an expected position of the object at a prediction time. The receiver is also configured to receive a perception prediction for an environment of the object, wherein the perception prediction is based on the safety envelope and includes environmental information associated with the object at the expected position at the prediction time. The device also includes a processor configured to generate an instruction to move a robot according to a safe movement instruction based on whether a perception check exceeds a predetermined threshold, wherein the perception check is based on a difference between the perception prediction and the sensor information indicative of the environment of the object at the prediction time.

Example 2 is the device of example 1, wherein the reachable set of locations is based on object status information associated with the object at a first location at a first time, wherein the prediction time is subsequent to the first time.

Example 3 is the device of example 2, wherein the object status information includes a velocity, a trajectory, and/or an acceleration of the object.

Example 4 is the device of any one of examples 1 to 3, wherein the receiver is configured to receive from a server that is remote to the robot at least one of the following: the safety envelope, the safe movement instruction, or the perception prediction.

Example 5 is the device of any one of examples 1 to 4, wherein the safe movement instruction is associated with the prediction time and based on the safety envelope.

Example 6 is the device of any one of examples 1 to 5, wherein the device is incorporated into the robot.

Example 7 is the device of any one of examples 1 to 6, further including a sensor configured to provide the sensor information to the receiver.

Example 8 is the device of example 7, wherein the sensor includes a depth sensor, a camera, a radar, a light ranging and detection sensor, and/or an ultrasonic sensor.

Example 9 is the device of any one of examples 1 to 8, wherein the safety envelope includes a plurality of reachable sets, wherein each reachable set of the plurality of reachable sets is for an associated prediction time of a plurality of prediction times, wherein each reachable set includes a reachable set of locations for the object at the associated prediction time.

Example 10 is the device of any one of examples 1 to 9, wherein the safety envelope for the object includes a plurality of safety envelopes for a plurality of objects, wherein each safety envelope of the plurality of safety envelopes is for an associated object of the plurality of objects.

Example 11 is the device of any one of examples 1 to 10, wherein the processor is further configured to, if the perception check exceeds the predetermined threshold, generate an instruction to modify the safe movement instruction of the robot.

Example 12 is the device of example 11, wherein the instruction to modify the safe movement instruction includes an instruction to stop a motion of the robot.

Example 13 is the device of either of examples 11 or 12, wherein the instruction to modify the safe movement instruction includes an instruction to slow a motion of the robot.

Example 14 is the device of any one of examples 1 to 13, wherein the difference includes an actual object position of the object that is different from the expected position.

Example 15 is the device of any one of examples 1 to 14, wherein the prediction time includes a subinterval of an expected latency to move the robot according to the safe movement instruction.

Example 16 is the device of any one of examples 1 to 15, wherein the receiver is further configured to receive the safety envelope at an update time, wherein if the perception check exceeds the predetermined threshold, the processor is further configured to generate an instruction to modify the safe movement instruction of the robot based on an elapsed time between the update time and the prediction time.

Example 17 is the device of any one of examples 1 to 16, wherein processor is further configured to generate a subsequent safety envelope for a subsequent prediction time, wherein the subsequent safety envelope is based on an extrapolation of the safety envelope to the subsequent prediction time.

Example 18 is the device of any one of examples 1 to 17, wherein the safe movement instruction includes a selected task that is selected from a plurality of possible tasks, wherein each possible task of the plurality of possible tasks is associated with a safety attribute of the possible task.

Example 19 is the device of example 18, wherein the safety attribute includes an impact zone of the possible task, an approved list of allowed objects allowed in the impact zone, a disapproved list of disallowed object prohibited from the impact zone, and/or a motion restriction to robot motions associated with the possible task.

Example 20 is the device of example 19, wherein the impact zone includes an area around the robot that may be impacted by the robot motions associated with the possible task, wherein the impact zone is based on a current environment of the robot and a hazard rating of the possible task.

Example 21 is the device of either of examples 19 or 20, wherein the motion restriction includes at least one of the following: a speed limit, a force limit, an acceleration limit, or a partial motion limit to the robot motions for the possible task.

Example 22 is the device of example 21, wherein the safety attribute includes a simulated safety attribute based on simulated movements of the robot in a simulated environment associated with the possible task.

Example 23 is the device of example 22, wherein the simulated environment for the possible task includes a simulated trajectory of a simulated object within the simulated environment and/or a simulated hazard rating of the possible task.

Example 24 is the device of any one of examples 18 to 23, wherein the receiver is further configured to receive sensor data indicative of a current environment of the robot, wherein the selected task is selected based on a comparison of the current environment to the simulated environment.

Example 25 is the device of any one of examples 19 to 24, wherein the receiver is further configured to receive sensor data indicative of a current environment of the robot, wherein the processor is further configured to generate a risk mitigation instruction based on the current environment, wherein the risk mitigation instruction is configured to modify based on the current environment the safe movement instruction to comply with the motion restriction, to respond to an object in the current environment that is not on the approved list or is on the disapproved list, and/or to request a new task from the plurality of possible tasks.

Example 26 is the device of example 25, wherein the risk mitigation instruction includes at least one of the following: an instruction to reduce a speed of the robot, an instruction to change a trajectory of the robot, an instruction to interrupt the selected task, and/or an instruction to provide a warning message.

Example 27 is the device of any one of examples 24 to 26, further including a sensor configured to provide the sensor data to the receiver, wherein the sensor includes a camera, a LiDAR, or a radar directed to the environment of the robot.

Example 28 is the device of any one of examples 18 to 27, wherein the plurality of possible tasks are stored on a sever remote from the robot.

Example 29 is a method that includes receiving a safety envelope for an object, wherein the safety envelope includes a reachable set of locations at an expected position of the object at a prediction time. The method also includes receiving a perception prediction for an environment of the object, wherein the perception prediction is based on the safety envelope and includes environmental information associated with the object at the expected position at the prediction time. The method also includes generating an instruction to move a robot according to a safe movement instruction based on whether a perception check exceeds a predetermined threshold, wherein the perception check is based on a difference between the perception prediction and the sensor information indicative of the environment of the object at the prediction time.

Example 30 is the method of example 29, wherein the reachable set of locations is based on object status information associated with the object at a first location at a first time, wherein the prediction time is subsequent to the first time.

Example 31 is the method of example 30, wherein the object status information includes a velocity, a trajectory, and/or or an acceleration of the object.

Example 32 is the method of any one of examples 29 to 31, further including receiving from a server that is remote to the robot at least one of the following: the safety envelope, the safe movement instruction, or the perception prediction.

Example 33 is the method of any one of examples 29 to 32, wherein the safe movement instruction is associated with the prediction time and based on the safety envelope.

Example 34 is the method of any one of examples 29 to 33, further including receiving the sensor information from a sensor.

Example 35 is the method of example 34, wherein the sensor includes a depth sensor, a camera, a radar, a light ranging and detection sensor, and/or an ultrasonic sensor.

Example 36 is the method of any one of examples 29 to 35, wherein the safety envelope includes a plurality of reachable sets, wherein each reachable set of the plurality of reachable sets is for an associated prediction time of a plurality of prediction times, wherein each reachable set includes a reachable set of locations for the object at the associated prediction time.

Example 37 is the method of any one of examples 29 to 36, wherein the safety envelope for the object includes a plurality of safety envelopes for a plurality of objects, wherein each safety envelope of the plurality of safety envelopes is for an associated object of the plurality of objects.

Example 38 is the method of any one of examples 29 to 37, further including generating, if the perception check exceeds the predetermined threshold, an instruction to modify the safe movement instruction of the robot.

Example 39 is the method of example 38, wherein the instruction to modify the safe movement instruction includes an instruction to stop a motion of the robot.

Example 40 is the method of either of examples 38 or 39, wherein the instruction to modify the safe movement instruction includes an instruction to slow a motion of the robot.

Example 41 is the method of any one of examples 29 to 40, wherein the difference includes an actual object position of the object that is different from the expected position.

Example 42 is the method of any one of examples 29 to 41, wherein the prediction time includes a subinterval of an expected latency to move the robot according to the safe movement instruction.

Example 43 is the method of any one of examples 29 to 42, further including receiving the safety envelope at an update time, wherein if the perception check exceeds the predetermined threshold, generating an instruction to modify the safe movement instruction of the robot based on an elapsed time between the update time and the prediction time.

Example 44 is the method of any one of examples 29 to 43, further including generating a subsequent safety envelope for a subsequent prediction time, wherein the subsequent safety envelope is based on an extrapolation of the safety envelope to the subsequent prediction time.

Example 45 is the method of any one of examples 29 to 44, wherein the safe movement instruction includes a selected task that is selected from a plurality of possible tasks, wherein each possible task of the plurality of possible tasks is associated with a safety attribute of the possible task.

Example 46 is the method of example 45, wherein the safety attribute includes an impact zone of the possible task, an approved list of allowed objects allowed in the impact zone, a disapproved list of disallowed object prohibited from the impact zone, and/or a motion restriction to robot motions associated with the possible task.

Example 47 is the method of example 46, wherein the impact zone includes an area around the robot that may be impacted by the robot motions associated with the possible task, wherein the impact zone is based on a current environment of the robot and a hazard rating of the possible task.

Example 48 is the method of either of examples 46 or 47, wherein the motion restriction includes at least one of the following: a speed limit, a force limit, an acceleration limit, or a partial motion limit to the robot motions for the possible task.

Example 49 is the method of example 48, wherein the safety attribute includes a simulated safety attribute based on simulated movements of the robot in a simulated environment associated with the possible task.

Example 50 is the method of example 49, wherein the simulated environment for the possible task includes a simulated trajectory of a simulated object within the simulated environment and/or a simulated hazard rating of the possible task.

Example 51 is the method of any one of examples 45 to 50, further including receiving the sensor data indicative of a current environment of the robot, and selecting the selected task based on a comparison of the current environment to the simulated environment.

Example 52 is the method of any one of examples 46 to 51, further including receiving sensor data indicative of a current environment of the robot, and generating a risk mitigation instruction based on the current environment, wherein the risk mitigation instruction is configured to modify based on the current environment the safe movement instruction to comply with the motion restriction, to respond to an object in the current environment that is not on the approved list or is on the disapproved list, and/or to request a new task from the plurality of possible tasks.

Example 53 is the method of example 52, wherein the risk mitigation instruction includes at least one of the following: an instruction to reduce a speed of the robot, an instruction to change a trajectory of the robot, an instruction to interrupt the selected task, and/or an instruction to provide a warning message.

Example 54 is the method of any one of examples 51 to 53, further including receiving the sensor data from a sensor, wherein the sensor includes a camera, a LiDAR, or a radar directed to the environment of the robot.

Example 55 is the method of any one of examples 45 to 54, wherein the plurality of possible tasks are stored on a sever remote from the robot.

Example 56 is an apparatus including a means for receiving a safety envelope for an object, wherein the safety envelope includes a reachable set of locations at an expected position of the object at a prediction time. The means for receiving is also configured to receive a perception prediction for an environment of the object, wherein the perception prediction is based on the safety envelope and includes environmental information associated with the object at the expected position at the prediction time. The apparatus also includes a means for generating an instruction to move a robot according to a safe movement instruction based on whether a perception check exceeds a predetermined threshold, wherein the perception check is based on a difference between the perception prediction and the sensor information indicative of the environment of the object at the prediction time.

Example 57 is the apparatus of example 56, wherein the reachable set of locations is based on object status information associated with the object at a first location at a first time, wherein the prediction time is subsequent to the first time.

Example 58 is the apparatus of example 57, wherein the object status information includes a velocity, a trajectory, and/or or an acceleration of the object.

Example 59 is the apparatus of any one of examples 56 to 58, wherein the means for receiving is configured to receive from a server that is remote to the robot at least one of the following: the safety envelope, the safe movement instruction, or the perception prediction.

Example 60 is the apparatus of any one of examples 56 to 59, wherein the safe movement instruction is associated with the prediction time and based on the safety envelope.

Example 61 is the apparatus of any one of examples 56 to 60, wherein the apparatus is incorporated into the robot.

Example 62 is the apparatus of any one of examples 56 to 61, further including a means for sensing the sensor information.

Example 63 is the apparatus of example 62, wherein the means for sensing includes a depth sensor, a camera, a radar, a light ranging and detection sensor, and/or an ultrasonic sensor.

Example 64 is the apparatus of any one of examples 56 to 63, wherein the safety envelope includes a plurality of reachable sets, wherein each reachable set of the plurality of reachable sets is for an associated prediction time of a plurality of prediction times, wherein each reachable set includes a reachable set of locations for the object at the associated prediction time.

Example 65 is the apparatus of any one of examples 56 to 64, wherein the safety envelope for the object includes a plurality of safety envelopes for a plurality of objects, wherein each safety envelope of the plurality of safety envelopes is for an associated object of the plurality of objects.

Example 66 is the apparatus of any one of examples 56 to 65, further including a means for generating, if the perception check exceeds the predetermined threshold, an instruction to modify the safe movement instruction of the robot.

Example 67 is the apparatus of example 66, wherein the instruction to modify the safe movement instruction includes an instruction to stop a motion of the robot.

Example 68 is the apparatus of either of examples 66 or 67, wherein the instruction to modify the safe movement instruction includes an instruction to slow a motion of the robot.

Example 69 is the apparatus of any one of examples 56 to 68, wherein the difference includes an actual object position of the object that is different from the expected position.

Example 70 is the apparatus of any one of examples 56 to 69, wherein the prediction time includes a subinterval of an expected latency to move the robot according to the safe movement instruction.

Example 71 is the apparatus of any one of examples 56 to 70, wherein the means for receiving is configured to receive the safety envelope at an update time, wherein if the perception check exceeds the predetermined threshold, the apparatus further including a means for generating an instruction to modify the safe movement instruction of the robot based on an elapsed time between the update time and the prediction time.

Example 72 is the apparatus of any one of examples 56 to 71, further including a means for generating a subsequent safety envelope for a subsequent prediction time, wherein the subsequent safety envelope is based on an extrapolation of the safety envelope to the subsequent prediction time.

Example 73 is the apparatus of any one of examples 56 to 72, wherein the safe movement instruction includes a selected task that is selected from a plurality of possible tasks, wherein each possible task of the plurality of possible tasks is associated with a safety attribute of the possible task.

Example 74 is the apparatus of example 73, wherein the safety attribute includes an impact zone of the possible task, an approved list of allowed objects allowed in the impact zone, a disapproved list of disallowed object prohibited from the impact zone, and/or a motion restriction to robot motions associated with the possible task.

Example 75 is the apparatus of example 74, wherein the impact zone includes an area around the robot that may be impacted by the robot motions associated with the possible task, wherein the impact zone is based on a current environment of the robot and a hazard rating of the possible task.

Example 76 is the apparatus of either of examples 74 or 75, wherein the motion restriction includes at least one of the following: a speed limit, a force limit, an acceleration limit, or a partial motion limit to the robot motions for the possible task.

Example 77 is the apparatus of example 76, wherein the safety attribute includes a simulated safety attribute based on simulated movements of the robot in a simulated environment associated with the possible task.

Example 78 is the apparatus of example 77, wherein the simulated environment for the possible task includes a simulated trajectory of a simulated object within the simulated environment and/or a simulated hazard rating of the possible task.

Example 79 is the apparatus of any one of examples 73 to 78, wherein the means for receiving is further configured to receive sensor data indicative of a current environment of the robot, wherein the selected task is selected based on a comparison of the current environment to the simulated environment.

Example 80 is the apparatus of any one of examples 74 to 79, wherein the means for receiving is further configured to receive sensor data indicative of a current environment of the robot, the apparatus further including a means for generating a risk mitigation instruction based on the current environment, wherein the risk mitigation instruction is configured to modify based on the current environment the safe movement instruction to comply with the motion restriction, to respond to an object in the current environment that is not on the approved list or is on the disapproved list, and/or to request a new task from the plurality of possible tasks.

Example 81 is the apparatus of example 80, wherein the risk mitigation instruction includes at least one of the following: an instruction to reduce a speed of the robot, an instruction to change a trajectory of the robot, an instruction to interrupt the selected task, and/or an instruction to provide a warning message.

Example 82 is the apparatus of any one of examples 79 to 81, further including a sensing means configured to provide the sensor data to the means for receiving, wherein the sensing means includes a camera, a LiDAR, or a radar directed to the environment of the robot.

Example 83 is the apparatus of any one of examples 73 to 82, wherein the plurality of possible tasks are stored on a sever remote from the robot.

Example 84 is a non-transitory computer readable medium, including instructions which, if executed, cause a receiver to receive a safety envelope for an object, wherein the safety envelope includes a reachable set of locations at an expected position of the object at a prediction time. The instructions also cause the receiver to receive a perception prediction for an environment of the object, wherein the perception prediction is based on the safety envelope and includes environmental information associated with the object at the expected position at the prediction time. The instructions also cause a processor to generate an instruction to move a robot according to a safe movement instruction based on whether a perception check exceeds a predetermined threshold, wherein the perception check is based on a difference between the perception prediction and the sensor information indicative of the environment of the object at the prediction time.

Example 85 is the non-transitory computer readable medium of example 84, wherein the reachable set of locations is based on object status information associated with the object at a first location at a first time, wherein the prediction time is subsequent to the first time.

Example 86 is the non-transitory computer readable medium of example 85, wherein the object status information includes a velocity, a trajectory, and/or or an acceleration of the object.

Example 87 is the non-transitory computer readable medium of any one of examples 84 to 86, wherein the instructions also cause the receiver to receive from a server that is remote to the robot at least one of the following: the safety envelope, the safe movement instruction, or the perception prediction.

Example 88 is the non-transitory computer readable medium of any one of examples 84 to 87, wherein the safe movement instruction is associated with the prediction time and based on the safety envelope.

Example 89 is the non-transitory computer readable medium of any one of examples 84 to 88, wherein the non-transitory computer readable medium is incorporated into the robot.

Example 90 is the non-transitory computer readable medium of any one of examples 84 to 89, wherein the instructions also cause a sensor to provide the sensor information to the receiver.

Example 91 is the non-transitory computer readable medium of example 90, wherein the sensor includes a depth sensor, a camera, a radar, a light ranging and detection sensor, and/or an ultrasonic sensor.

Example 92 is the non-transitory computer readable medium of any one of examples 84 to 91, wherein the safety envelope includes a plurality of reachable sets, wherein each reachable set of the plurality of reachable sets is for an associated prediction time of a plurality of prediction times, wherein each reachable set includes a reachable set of locations for the object at the associated prediction time.

Example 93 is the non-transitory computer readable medium of any one of examples 84 to 92, wherein the safety envelope for the object includes a plurality of safety envelopes for a plurality of objects, wherein each safety envelope of the plurality of safety envelopes is for an associated object of the plurality of objects.

Example 94 is the non-transitory computer readable medium of any one of examples 84 to 93, wherein the instructions also cause the processor to, if the perception check exceeds the predetermined threshold, generate an instruction to modify the safe movement instruction of the robot.

Example 95 is the non-transitory computer readable medium of example 94, wherein the instruction to modify the safe movement instruction includes an instruction to stop a motion of the robot.

Example 96 is the non-transitory computer readable medium of either of examples 94 or 95, wherein the instruction to modify the safe movement instruction includes an instruction to slow a motion of the robot.

Example 97 is the non-transitory computer readable medium of any one of examples 84 to 96, wherein the difference includes an actual object position of the object that is different from the expected position.

Example 98 is the non-transitory computer readable medium of any one of examples 84 to 97, wherein the prediction time includes a subinterval of an expected latency to move the robot according to the safe movement instruction.

Example 99 is the non-transitory computer readable medium of any one of examples 84 to 98, wherein the instructions also cause the receiver to receive the safety envelope at an update time, wherein if the perception check exceeds the predetermined threshold, wherein the instructions also cause the processor to generate an instruction to modify the safe movement instruction of the robot based on an elapsed time between the update time and the prediction time.

Example 100 is the non-transitory computer readable medium of any one of examples 84 to 99, wherein the instructions also cause the processor to generate a subsequent safety envelope for a subsequent prediction time, wherein the subsequent safety envelope is based on an extrapolation of the safety envelope to the subsequent prediction time.

Example 101 is the non-transitory computer readable medium of any one of examples 84 to 100, wherein the safe movement instruction includes a selected task that is selected from a plurality of possible tasks, wherein each possible task of the plurality of possible tasks is associated with a safety attribute of the possible task.

Example 102 is the non-transitory computer readable medium of example 101, wherein the safety attribute includes an impact zone of the possible task, an approved list of allowed objects allowed in the impact zone, a disapproved list of disallowed object prohibited from the impact zone, and/or a motion restriction to robot motions associated with the possible task.

Example 103 is the non-transitory computer readable medium of example 102, wherein the impact zone includes an area around the robot that may be impacted by the robot motions associated with the possible task, wherein the impact zone is based on a current environment of the robot and a hazard rating of the possible task.

Example 104 is the non-transitory computer readable medium of either of examples 102 or 103, wherein the motion restriction includes at least one of the following: a speed limit, a force limit, an acceleration limit, or a partial motion limit to the robot motions for the possible task.

Example 105 is the non-transitory computer readable medium of example 104, wherein the safety attribute includes a simulated safety attribute based on simulated movements of the robot in a simulated environment associated with the possible task.

Example 106 is the non-transitory computer readable medium of example 105, wherein the simulated environment for the possible task includes a simulated trajectory of a simulated object within the simulated environment and/or a simulated hazard rating of the possible task.

Example 107 is the non-transitory computer readable medium of any one of examples 101 to 106, wherein the instructions also cause the receiver to receive sensor data indicative of a current environment of the robot, wherein the selected task is selected based on a comparison of the current environment to the simulated environment.

Example 108 is the non-transitory computer readable medium of any one of examples 102 to 107, wherein the instructions also cause the receiver to receive sensor data indicative of a current environment of the robot, wherein the instructions also cause the processor to generate a risk mitigation instruction based on the current environment, wherein the risk mitigation instruction is configured to modify based on the current environment the safe movement instruction to comply with the motion restriction, to respond to an object in the current environment that is not on the approved list or is on the disapproved list, and/or to request a new task from the plurality of possible tasks.

Example 109 is the non-transitory computer readable medium of example 108, wherein the risk mitigation instruction includes at least one of the following: an instruction to reduce a speed of the robot, an instruction to change a trajectory of the robot, an instruction to interrupt the selected task, and/or an instruction to provide a warning message.

Example 110 is the non-transitory computer readable medium of any one of examples 107 to 109, wherein the instructions also cause a sensor to provide the sensor data to the receiver, wherein the sensor includes a camera, a LiDAR, or a radar directed to the environment of the robot.

Example 111 is the non-transitory computer readable medium of any one of examples 101 to 110, wherein the plurality of possible tasks are stored on a sever remote from the robot.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A device comprising:

a receiver configured to receive a safety envelope for an object, wherein the safety envelope comprises a reachable set of locations that the object may reach at an expected position of the object at a prediction time, receive a perception prediction for an environment of the object, wherein the perception prediction comprises a predicted value of sensor data with respect to the object in the environment at the prediction time, wherein the predicted value of the sensor data is based on the safety envelope and comprises environmental information associated with the object at the expected position at the prediction time, and a processor configured to:

generate an instruction to move a robot according to a safe movement instruction based on whether a perception check exceeds a predetermined threshold, wherein the perception check is based on a difference between the perception prediction and sensor information indicative of the environment of the object at the prediction time, wherein the processor is configured to determine the prediction time based on a subinterval of an expected latency to move the robot according to the safe movement instruction; and control the robot to move according to the safe movement instruction.

2. The device of claim 1, wherein the reachable set of locations is based on object status information associated with the object at a first location at a first time, wherein the prediction time is subsequent to the first time.

3. The device of claim 2, wherein the object status information comprises a velocity, a trajectory, and/or or an acceleration of the object.

4. The device of claim 1, wherein the safe movement instruction is associated with the prediction time and based on the safety envelope.

5. The device of claim 1, further comprising a sensor configured to provide the sensor information to the receiver, wherein the sensor comprises a depth sensor, a camera, a radar, a light ranging and detection sensor, and/or an ultrasonic sensor.

6. The device of claim 1, wherein the safety envelope comprises a plurality of reachable sets, wherein each reachable set of the plurality of reachable sets is for an associated prediction time of a plurality of prediction times, wherein each reachable set comprises a reachable set of locations that the object may reach at the associated prediction time.

7. The device of claim 1, wherein the safety envelope for the object comprises a plurality of safety envelopes for a plurality of objects, each safety envelope of the plurality of safety envelopes corresponding to an associated one of the plurality of objects.

8. The device of claim 1, wherein the processor is further configured to generate an instruction to modify the safe movement instruction of the robot if the perception check exceeds the predetermined threshold.

9. The device of claim 1, wherein the difference comprises an actual object position of the object that is different from the expected position.

10. The device of claim 1, wherein the receiver is further configured to receive the safety envelope at an update time, wherein if the perception check exceeds the predetermined threshold, the processor is further configured to generate an instruction to modify the safe movement instruction of the robot based on an elapsed time between the update time and the prediction time.

11. The device of claim 1, wherein processor is further configured to generate a subsequent safety envelope for a subsequent prediction time, wherein the subsequent safety envelope is based on an extrapolation of the safety envelope to the subsequent prediction time.

12. A non-transitory computer readable medium, including instructions which, if executed, cause a receiver to:

receive a selected task from a plurality of possible tasks, wherein each possible task of the plurality of possible tasks is associated with a safety attribute of the possible task; and receive a perception prediction for an environment of an object, wherein the perception prediction comprises a predicted value of sensor data with respect to the object in the environment at the prediction time, wherein the predicted value of the sensor data is based on the safety envelope and comprises environmental information associated with the object at an expected position at a prediction time, wherein the instructions are further configured to cause a processor to:

generate an instruction to move a robot according to a safe movement instruction based on whether a perception check exceeds a predetermined threshold, wherein the perception check is based on a difference between the perception prediction and sensor information indicative of the environment of the object at the prediction time, wherein the instructions further cause the processor to determine the prediction time based on a subinterval of an expected latency to move the robot according to the safe movement instruction; and control the robot to move according to the safe movement instruction.

13. The non-transitory computer readable medium of claim 12, wherein the safe movement instruction comprises a selected task that is selected from a plurality of possible tasks, wherein each possible task of the plurality of possible tasks is associated with a safety attribute of the possible task.

14. The non-transitory computer readable medium of claim 13, wherein the safety attribute comprises an impact zone of the possible task, an approved list of allowed objects allowed in the impact zone, a disapproved list of disallowed object prohibited from the impact zone, and/or a motion restriction to robot motions associated with the possible task.

15. The non-transitory computer readable medium of claim 14, wherein the impact zone comprises an area around the robot that may be impacted by robot motions associated with the possible task, wherein the impact zone is based on a current environment of the robot and a hazard rating of the possible task.

16. The non-transitory computer readable medium of claim 14, wherein the motion restriction comprises at least one of the following: a speed limit, a force limit, an acceleration limit, or a partial motion limit to the robot motions for the possible task.

17. The non-transitory computer readable medium of claim 16, wherein the safety attribute comprises a simulated safety attribute based on simulated movements of the robot in a simulated environment associated with the possible task.

18. The non-transitory computer readable medium of claim 12, wherein the receiver is further configured to receive sensor data indicative of a current environment of the robot, wherein the selected task is selected based on a comparison of the current environment to the simulated environment.

19. The non-transitory computer readable medium of claim 13, wherein the receiver is further configured to receive sensor data indicative of a current environment of the robot, wherein the processor is further configured to generate a risk mitigation instruction based on the current environment, wherein the risk mitigation instruction is configured to modify based on the current environment the safe movement instruction to comply with the motion restriction, to respond to an object in the current environment that is not on the approved list or is on the disapproved list, and/or to request a new task from the plurality of possible tasks.

20. The non-transitory computer readable medium of claim 19, wherein the risk mitigation instruction comprises at least one of the following: an instruction to reduce a speed of the robot, an instruction to change a trajectory of the robot, an instruction to interrupt the selected task, and/or an instruction to provide a warning message.

21. An apparatus comprising:
a means for receiving a safety envelope for an object, wherein the safety envelope comprises a reachable set of locations that the object may reach at an expected position of the object at a prediction time,
a means for receiving a perception prediction for an environment of the object, wherein the perception prediction comprises a predicted value of sensor data with respect to the object in the environment at the prediction time, wherein the predicted value of the sensor data is based on the safety envelope and comprises environmental information associated with the object at the expected position at the prediction time, and
a means for generating an instruction to move a robot according to a safe movement instruction based whether a perception check exceeds a predetermined threshold, wherein the perception check is based on a difference between the perception prediction and sensor information indicative of the environment of the object at the prediction time; a means for determining the prediction time based on a subinterval of an expected latency to move the robot according to the safe movement instruction; and
a means for controlling the robot to move according to the safe movement instruction.

22. The apparatus of claim 21, wherein the reachable set of locations is based on object status information associated with the object at a first location at a first time, wherein the prediction time is subsequent to the first time.

23. The apparatus of claim 22, wherein the object status information comprises a velocity, a trajectory, and/or an acceleration of the object.

24. The apparatus of claim 21, wherein the safety envelope for the object comprises a plurality of safety envelopes for a plurality of objects, each safety envelope of the plurality of safety envelopes corresponding to an associated one of the plurality of objects.

25. The apparatus of claim 21, the apparatus further comprising a means for generating an instruction to modify the safe movement instruction of the robot if the perception check exceeds the predetermined threshold.

* * * * *